INVENTOR.
HARRY J. HARTZ

ATTORNEY.

*INVENTOR.*
HARRY J. HARTZ
ATTORNEY.

INVENTOR.
HARRY J. HARTZ

July 28, 1959 H. J. HARTZ 2,896,655
CONTROL APPARATUS WITH ELECTRO-MAGNETIC RATE AND RESET
Filed Jan. 4, 1955 7 Sheets-Sheet 7

INVENTOR.
HARRY J. HARTZ
BY
ATTORNEY.

United States Patent Office 2,896,655
Patented July 28, 1959

2,896,655

CONTROL APPARATUS WITH ELECTRO-MAGNETIC RATE AND RESET

Harry J. Hartz, Philadelphia, Pa., assignor to Minneapolis-Honeywell Regulator Company, Minneapolis, Minn., a corporation of Delaware Application January 4, 1955, Serial No. 479,819

27 Claims. (Cl. 137—86)

A general object of the present invention is to provide improved control apparatus of the general type in which a capillary or other flow restricting passage has heretofore been utilized to retard liquid flow from one chambered space to another and thereby modify the rate at which a variation in a control quantity produces or completes a control action. The present invention may be used with advantage, for example, in a control instrument of the widely used type, one form of which is disclosed in the Moore Patent 2,125,081 of July 26, 1938. In that control instrument liquid is moved back and forth through a capillary passage connecting two liquid filled chambers having flexible walls, as a result of variations in a fluid pressure acting against a flexible wall of one of said chambers, to thereby effect reset actions.

A primary object of the present invention is to provide novel means for regulating the flow of liquid between two chambers to thereby modify a control action produced by the liquid flow.

Another and more specific object of the invention is to provide simple and effective means for regulating the control action of a controller by the action of adjustable regulating means at a distance from the controller.

A still more specific object of the invention is to regulate the control action of the controller by magnetic means operative to vary the viscosity of a liquid flow and thereby modify a control action such as controller reset or rate. While the present invention may be used with marked advantage in the previously mentioned Moore type of controller, it is also well adapted for use in other types of control apparatus developing regulable control actions.

A further object of the present invention is to disclose a way of introducing the aforementioned rate control action ahead of reset so that the time normally required for a variable to line out at the set point during automatic startup is materially reduced.

In the practice of the present invention, a liquid is moved through a non-magnetic flow passage at a rate which can be regulated by a magnetic action which varies the viscosity of the liquid. In the ordinary use of the present invention, the liquid having its viscosity varied, is a liquid containing solid suspended particles which may be magnetized. These particles may well be finely divided iron. In a controller having a conduit through which this liquid with its finely divided iron particles in suspension is passed, the rate at which the liquid will flow through the conduit can be closely controlled through a wide range by subjecting the liquid in the liquid filled conduit to a magnetizing action of a desired magnitude. When thus subjected to a variable magnetizing action, the magnetized portion of the fluid in the non-magnetic conduit acts like a throttle valve in that an increase in the magnetizing action decreases the flow of the liquid as would a throttling adjustment of an ordinary throttling valve.

The flow regulating effect of a magnetizing action on liquid with magnetizable particles suspended therein may well be employed for a wide variety of instrument control purposes, some of which are hereinafter illustrated and described.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described preferred embodiments of the invention.

Figure 2:
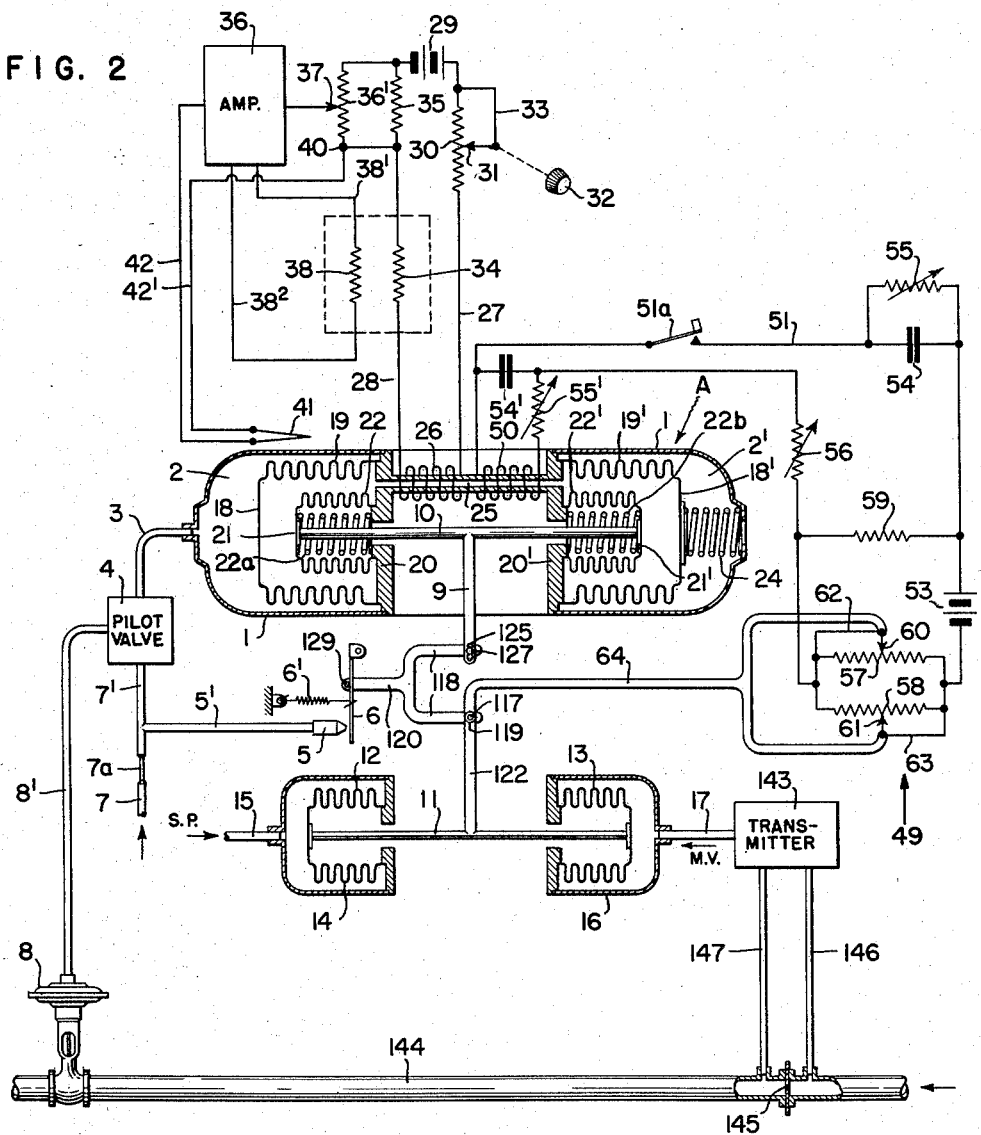
Fig. 2 is a diagrammatic illustration of a controller of the form shown in Fig. 1 associated with a non-linear magnetizing circuit means for increasing or decreasing the effect of the reset rate adjusting magnetizing means as shown in Fig. 1.
Figure 3A:
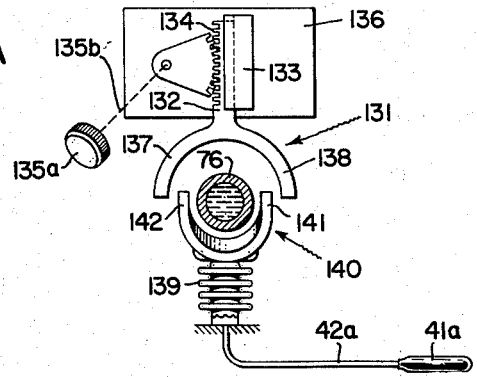
Fig. 3A shows a manually adjusted permanent magnet that can be used as an alternative way of adjusting either the reset rate adjusting unit shown in Fig. 1 or as a substitute for the rate time circuit shown in Fig. 3.
Figure 3:
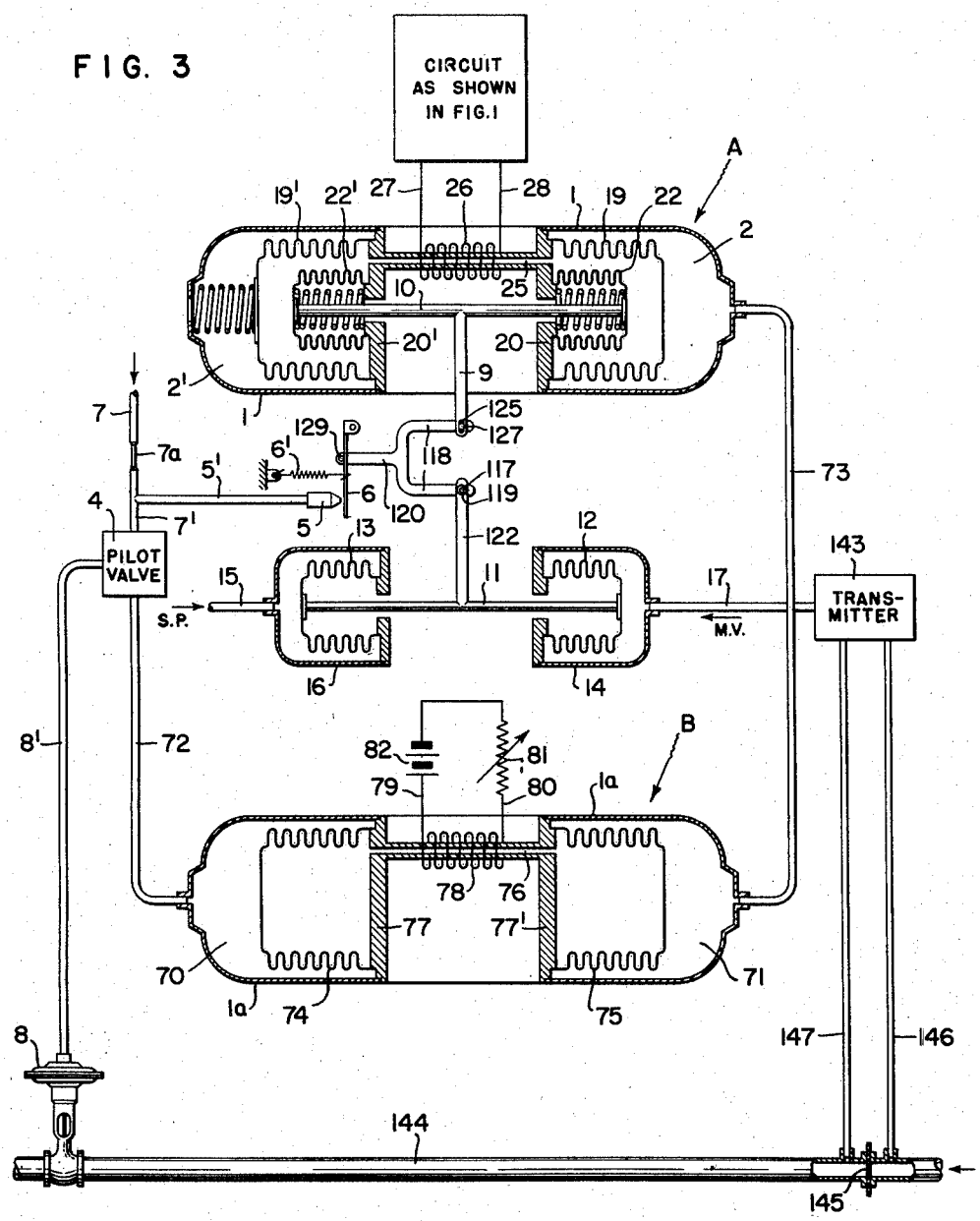
Fig. 3 is a diagrammatic illustration of a control apparatus comprising a controller like the controller of Fig. 1 which has been combined with a second controller element to control the rate time of the controller shown in Fig. 1.
Figure 4:
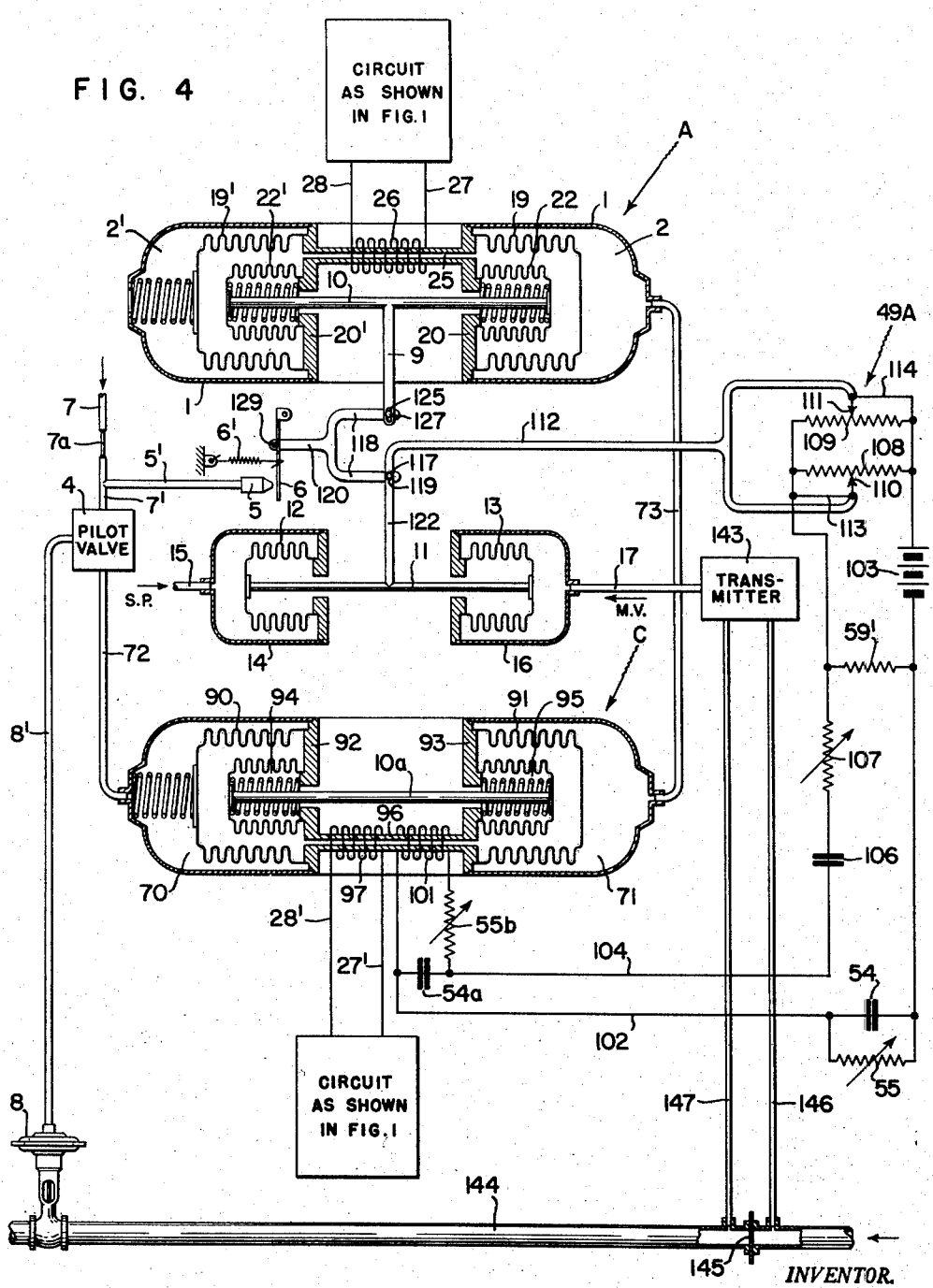
Fig. 4 is a diagrammatic illustration of control apparatus generally similar to the apparatus shown in Fig. 3, with the addition of non-linear magnetizing circuit means acting on a second or rate controller for varying the rate of the first mentioned controller.
Figure 5:
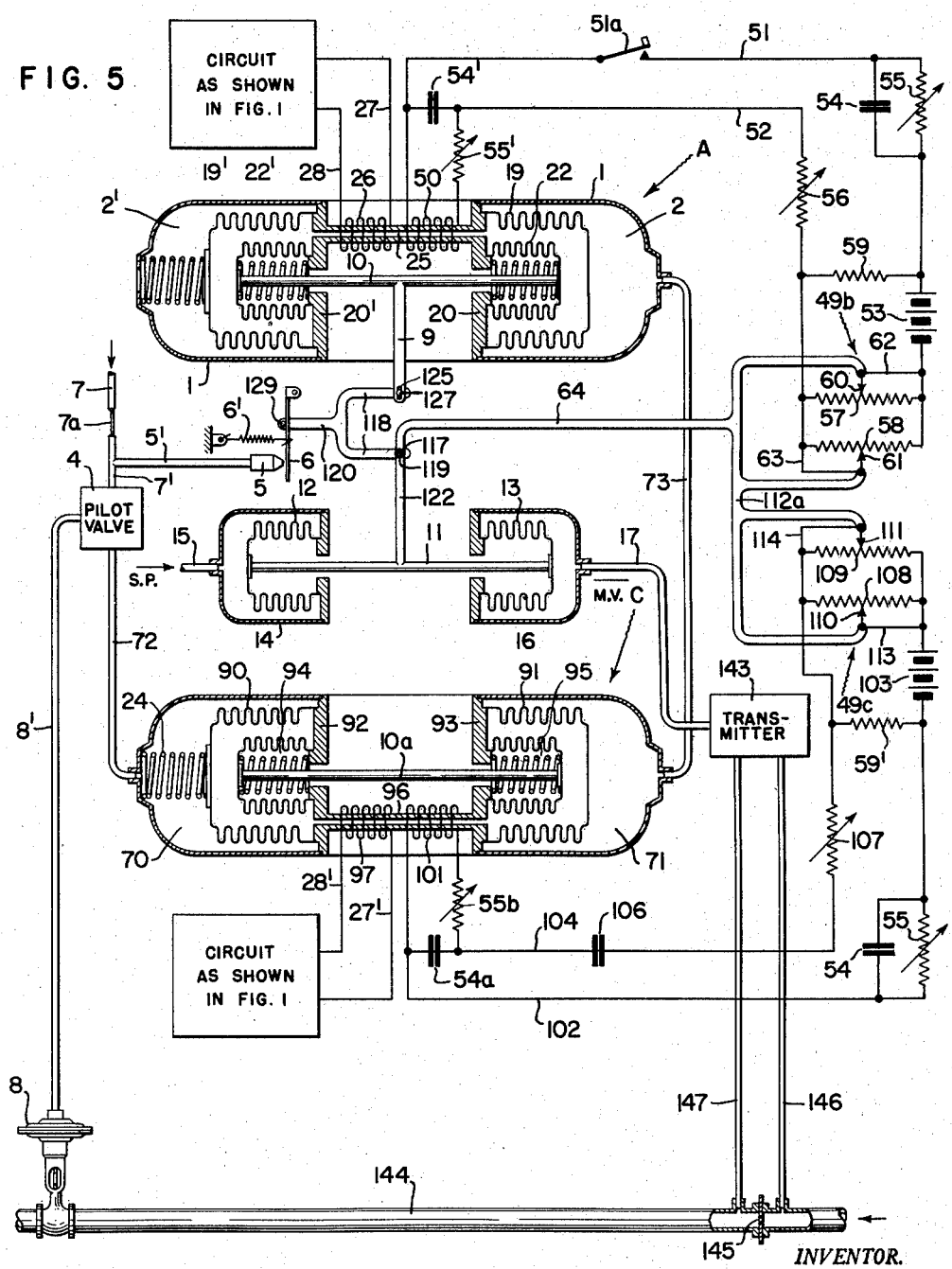
Figure 6:
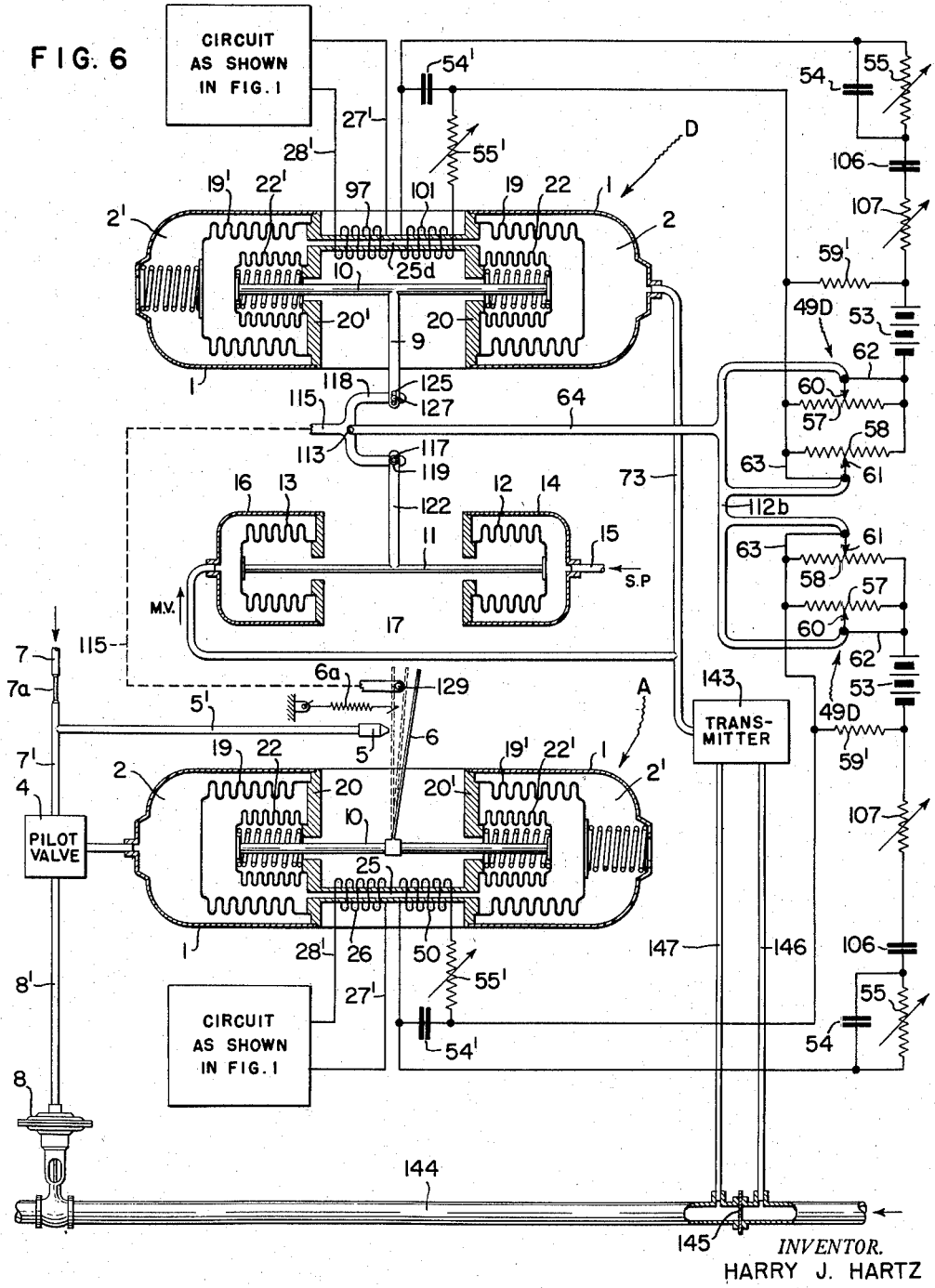
Figure 7:
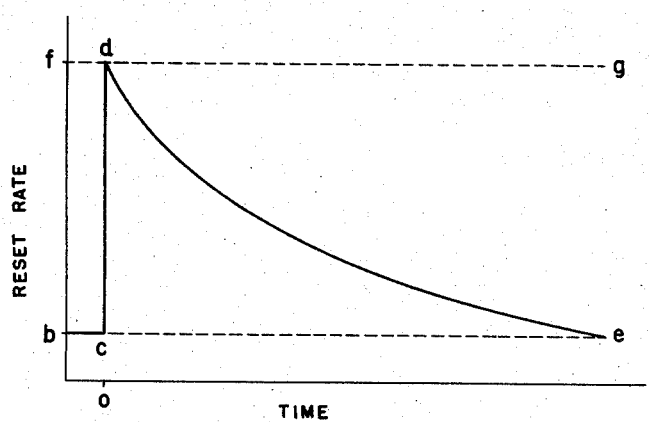
Figure 8:
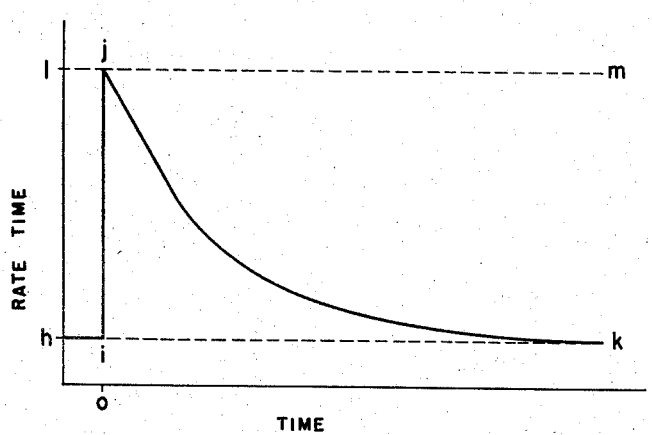

Fig. 5 diagrammatically illustrates a control apparatus similar to that shown in Fig. 4 with the addition of a second magnetizing circuit means for increasing or decreasing the effect of the reset circuit of the adjusting magnetizing means shown in Fig. 4;

Fig. 6 diagrammatically illustrates a control apparatus similar to that shown in Fig. 2 plus a rate time circuit similar to that shown in Fig. 3 for increasing or decreasing the magnetizing effect of a coil of a non-linear rate circuit; this figure also provides a mechanical linkage which is used to transmit rate response ahead of reset response;

Fig. 7 is a chart useful in illustrating the highly desirable controller results accomplished by using the non-linear reset effecting magnetizing circuit means shown in Fig. 2; and Fig. 8 is a chart useful in illustrating the highly desirable control results accomplished by using the non-linear rate effecting magnetizing circuit means shown in Fig. 4.

Unless otherwise noted corresponding components shown in the various figures carry corresponding reference characters.

Figure 1:
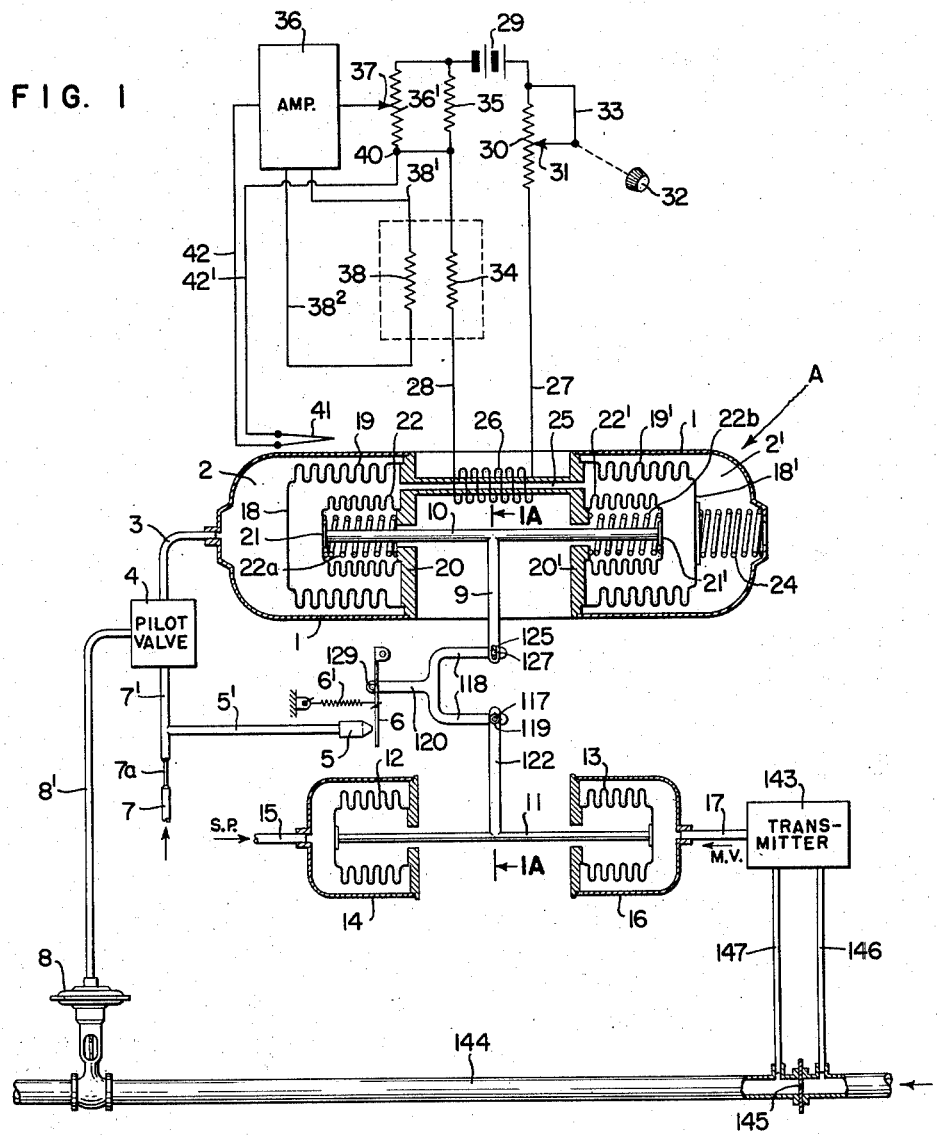
Fig. 1 is a diagrammatic illustration of a simple form of controller embodying the present invention having a magnetizing means for adjusting its reset rate and means permitting temperature compensation from a remotely located control station.

In Fig. 1, I have diagrammatically illustrated an embodiment of the present invention including an air controller A of the well known type such as shown in the previously mentioned Moore patent. Although not shown in Fig. 1, this invention follows the teaching set out in the Moore patent in that the throttling range adjustment shown in Fig. 5 of the Moore patent may be used with the controller disclosed in this application. Major elements of the controller A shown in Fig. 1 include a casing 1 enclosing an air chamber 2 in communication with an air conduit 3 connected to a relay device 4. The output pressure transmitted from the relay 4 to the chamber 2 through the pipe 3 is controlled by bleed nozzle and a spring biased flapper valve member 5, 6, and 6′, respectively. The bleed nozzle 5 is connected through a restricted orifice 7a to a pipe 7, the latter supplying air at a predetermined constant pressure. The air pressure in the nozzle 5, and also the air pressure in the pipe 3 and chamber 2, increases and decreases in a predetermined manner as the flapper valve 6 moves toward and away from the discharge end of the nozzle 5 through a relatively minute distance. Ordinarily, the pressure in the nozzle 5 may thus be varied between a minimum of about 3 pounds p.s.i. and a maximum of about 15 p.s.i. As shown, the air pressure in the relay 4 is transmitted to and regulates a control valve 8 and thereby regulates a control factor such as a fuel supply rate.

A thrust rod 11 has one end connected to the movable end wall of a set-point bellows element 12 and has its other end connected to the movable end wall of a bellows element 13. As shown, the bellows elements 12 and 13 are cup-shaped with their open ends facing one another. The open end of the bellows 12 is connected to a cup-shaped casing member 14. The space between the bellows elements 12 and 14 normally contains air under a predetermined set-point pressure transmitted to said space by a pipe 15. Ordinarily the set-point pressure maintained is adjustable. The bellows element 13 has its end adjacent the element 12 and is secured to the rim of a cup-shaped casing element 16. The space between the bellows elements 13 and 16 contains air or other fluid transmitted to the last mentioned chamber through a pipe 17 which varies with and is a measure of the controlled variable pressure M.V. That variable may take different forms. It may, for example, be a fluid pressure indicative of a pressure, velocity or weight. In the form used in this application there is shown a differential pressure measuring and transmitting device 143 for automatically varying the controlled variable pressure M.V. in accordance with the flow of a fluid through a conduit 144.

Any type of conventional differential pressure measuring and transmitting means may be used for the device schematically shown as reference numeral 143, for example, any means which is capable of measuring and transmitting a pressure representative of the differences between the pressure on the high and low pressure sides of an orifice plate, such as the plate 145, would be suitable. The pressure of the fluid on the high and low pressure side of the orifice plate 145 in the various figures of the drawing is transmitted to the device 143 by means of conduits 146, 147.

The end of the chamber 2 remote from the pipe connection 3 is closed by a rigid end wall 18 of a bellows chamber 19. The end wall of the chamber 19 opposite to the wall 18 comprises an annular stationary wall 20, and the rigid but axially adjustable end wall 21 of a cylindrical bellows element 22. The element 22 has one end connected to the rim of the wall 21 and has its other end connected to the inner edge of the annular wall 20. The casing 1 encloses a chamber 2′ at the right hand end of the instrument A, as seen in Fig. 1. The chamber 2′ has associated elements 18′, 19′, 20′, 21′, and 22′ corresponding to the previously mentioned elements 18 to 22. The thrust rod 10 extends between and has each end in engagement with the corresponding bellows end wall 21 or 21′. The chamber 2′ is in free communication with the atmosphere and the movable end wall 18′ of the chamber 19′ is subject to a compressive action by a relatively light spring 24 which acts between the wall 18′ and the juxtaposed portion of the casing 1. The bellows chambers 19 and 19′ are connected by a passageway in the form of a conduit 25 through which liquid normally passes from the chamber 19′ into the chamber 19 when the pressure in the chamber 19′ is increased. When the pressure in the chamber 19 is decreased, liquid normally flows through the passage 25 from the chamber 19′ into the chamber 19.

Figure 1A:
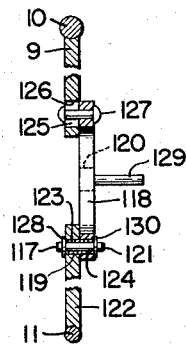
Fig. 1A shows a sectional view taken along the section line 1A—1A shown in Fig. 1.

As shown in Fig. 1 and Fig. 1A a pivoted link 118 comprising the portion 120 and pin 129 and the arms 9, 122 pivotally attached thereto enable single or joint movement of thrust rod 10 and/or 11 to be translated into flapper 6 motion.

Any change in the differential force caused by the M.V. and S.P. pressure acting on bellows 12, 13 will move the thrust rod 11 to either the right or to the left of the position shown in Fig. 1. When this thrust rod movement occurs, the arm 122, which may be fixedly attached by welding or brazing to the rod 11, will also be moved in this same direction.

If movement e.g. of the rod 11 and arm 122 is to the right of that shown in Fig. 1 the pin 117 mounted in self lubricating bearings 123, 124 will force the pivoted link 118 and pivot pin 127 attached thereto to be moved in a counter clockwise direction on a polished surface 125 of the arm 9, forming the slot 126. The pin 129 of link 118 will thus tension the spring 6′ of the flapper 6 to move the flapper away from the nozzle 5 during this latter mentioned movement.

If the rod 11 and arm 122 are moved to the left of the position shown in Fig. 1 the pin 117 will force the pivoted link 118 and its pivoted pin 129 in a clockwise direction about a polished surface 125. During this latter movement the pin 129 of link 118 will permit movement of the spring biased flapper 6 toward the nozzle 5.

Any increase or decrease in differential thrust rod force caused by differences of pressure acting on the bellows 20, 22 will move the thrust rod 10 to either the right or left side of the position shown in Fig. 1. When this thrust rod movement occurs the arm 9, which may be fixedly welded or brazed to the rod 10, will also be moved in this same direction. If movement e.g. of the rod 10 and arm 9 is to the right of that shown in Fig. 1 the pin 127, fixedly attached to the link 118, will be moved downwardly in the slot 126. As this latter movement takes place the pivoted link 118, and pivot pin 129 will be moved in a clockwise direction about pivot pin 117. The pin 129 of link 118 will thus tension the spring 6′ of the flapper 6, to move the flapper away from the nozzle 5 during this latter mentioned movement.

When the rod 10 and arm 9 are moved to the left of the position shown in Fig. 1 the arm 9 will force the sliding portion of the pivot pin 127 in an upward direction in the slot 126 and at the same time cause counter clockwise rotation of the pivot link 118 about the pivot pin 117. As this latter link 118 movement takes place the pin 129 will permit movement of the spring biased flapper 6 toward the nozzle 5. To retain the central portion of the pin 117 in contact with its associated bearing 123, 124, particularly during the above mentioned arm movements, the pin 117 is provided with two grooves 128, 130 for retaining snap rings 131 and 132. These rings will thus prevent excessive movement of the pin either to the right or left of the position shown in Fig. 1A.

Insofar as it has now been specifically described, the apparatus shown in Fig. 1 contains an apparatus similar to that disclosed in the Patent 2,125,081 except for the type of flapper actuating linkage used to move a flapper relative to a fixed nozzle.

The apparatus shown in Fig. 1 differs primarily from the apparatus disclosed in said prior patent in that the liquid filling the chambers 19 and 19′ and the conduit 25 is responsive to magnetic action and is subjected to such action by the coil 26 and the means for passing an electric current through the coil. As previously indicated, the chamber filling liquid may well be oil holding fine iron particles in suspension. In consequence, the viscosity of the liquid within the conduit 25 increases and decreases with the current flow through the coil 26 which surrounds the conduit 25. The electrical leads 27 and 28 of the coil 26 are connected across a source of direct current 29. The electrical lead 27 includes a slide wire resistor 30 engaged by a wiper contact 31 which may be manually adjusted along the resistor 30 by means of a remotely located reset dial 32. The wiper contact 31 is connected by a conductor 33 to the end of the resistor 30 adjacent the current source 29. In consequence, the resistance offered by the resistor 30 to the flow of current through the resistor increases and decreases as the wiper contact 31 is moved along the resistor 30 in the direction respectively towards and away from the current source 29. This same result could be accomplished if a permanent magnet of the type shown in Fig. 3A was used in lieu of the elements 30—33 shown in Fig. 1.

As shown, the electrical lead 28 includes a thermistor 34, a resistor 35 and associated elements for providing compensation for ambient temperature variations, as is hereinafter explained, and are not needed under some operating conditions. Whether the elements 34 and 35 are included in or omitted from the circuit including the coil 26 and current source 29, the effect of that circuit is to subject the controller A to a reset control action. Furthermore, the reset control rate may be varied by rotating the reset dial 32 and thus varying the strength of the current in the coil 26. The liquid in the conduit 25 may be a light hydro-carbon containing a suspension of finely divided iron particles. The iron particles within the magnetic field are mutually attracted and bonded together and thus increase the viscosity of the liquid to an extent which increases and decreases as the strength of the field created by the current flowing through coil 26 is increased and decreased. The coil 26 and the means for varying the current flow to that coil are thus operative to produce an effect on the liquid flow in the conduit 25 which is analogous to the effect which might be produced by the adjustment of a throttle valve regulating the liquid flow through the conduit 25.

To provide an ambient temperature compensating means for this control apparatus there is provided a temperature sensing element such as a thermocouple 41, an electrical connection $42^1$ between the thermocouple 41 and a resistor 35 which is in the aforementioned reset coil circuit 26, a second electrical connection 42 connecting the thermocouple to an amplifier 36, which amplifier in turn is connected to a wiper arm 37 of a large, variable resistor $36^1$. This temperature compensating means also contains an electrical connection $38^1$ and $38^2$ that connects the previously mentioned heater to the amplifier 36.

This temperature compensating means will sense any increase in ambient temperature through its thermocouple 41 which increase will cause the output voltage of the amplifier to rise, an increase in voltage drop across the heater 38 and a decrease in the resistance value of thermistor 34. This decrease will permit a greater current flow to pass through the reset coil circuit 26, 27, 28 and the resistor 35. While this increase in flow of current through the resistance 35 occurs a voltage drop across 35 will be realized by the reset coil circuit. Furthermore, while this current flow is taking place the voltage drop across the part of the resistance 36 between 37 and 40 will be increased to such a value that it will buck out the increased voltage caused by the thermocouple. When this bucking out action is completed, the amplifier will be brought to an equilibrium position at the new amplifier output level and will maintain a constant flow of current through the heater 38 which will in turn maintain a flow of current through the reset coil circuit at such a level that the effect of the aforementioned increased ambient temperature acting on the control apparatus will be overcome.

In order that the operation of the control apparatus as shown in Figure 1 of the drawing may be better understood, it will be assumed that an increase in the flow of fluid passing through the conduit 144 has occurred.

The effect of this increase will be transmitted by the high and low pressure lines 146, 147 located on either side of the orifice 145 to a differential pressure receiving and transmitting means 143. This receiving and transmitting means 143 determines the difference between these low and high pressures and it in turn transmits a pressure signal proportional to that difference through the conduit 17 to the chamber formed by the external surface of bellows 13 and the casing 16. The aforementioned increase in flow of fluid through the conduit orifice 145 will cause a greater difference in the respective pressures flowing through the conduits 146 and 147 and this difference in turn will cause the receiving and transmitting means 143 to transmit an increased pressure signal M.V. through the conduit 17 to the chamber formed by the external surface of the bellows 13 and the casing 16. When this increase in M.V. pressure occurs, the bellows 13 and thrust rod 11 attached thereto will be moved toward the left against the force of the S.P. pressure existing between the bellows 11 and casing 14. As this leftward movement of the thrust rod 11 occurs the arm 122, pivot pin 119, link 118, and pen 129 will also be moved toward the left and thus permit the spring $6^1$ to move the flapper 6 towards the nozzle 5. This flapper action will cause the pressure being transmitted through the conduits $5^1$ and $7^1$ to the relay 4 to be increased. When the relay senses this increase in pressure it will, in turn, transmit a proportionally greater pressure through the conduit $8^1$ to the head of a control valve 8 so as to immediately reduce the flow of fluid through the conduit 144. This proportional increase in the output pressure of the relay 4 is also fed back through the air conduit 3 to the air chamber 2 of the control unit A.

It should be kept in mind that the responses made by unit A of this control apparatus are practically instantaneous and not a slow step by step process which might be inferred from the following discussion of operation.

The immediate effect of the proportional pressure increase of the relay will cause an increase in pressure acting on the movable end of the bellows 18 of unit A. The immediate effect of this increase in pressure is transmitted through the fluid inside this bellows to the small inner bellows 22 causing the two inner bellows 22, 22' mounted on the rod 10 to move to the right. This action compresses the spring load of spring 22a of the left hand inner bellows 22 and extends the spring load of spring 22b of the right hand inner bellows. This action also causes the spring 24 outside the large right hand bellows to be compressed. This action of the two inner bellows 22 and 22' moving to the right will cause the thrust rod 10, arm 9, pin 127, link 118, and pin 129 to likewise be moved to the right. As the pin 129 is moved in this fashion to the right it will effect a clockwise movement of the link 118 and pin 129 about pin 119 against the flapper 6 and against the bias of the spring 6'.

The result of this latter mentioned flapper movement will be to decrease the pressure being transmitted through conduits 5' and 7'. This action in turn causes the relay pressure being transmitted to the conduit 8' to decrease.

This latter mentioned flapper action also causes a decrease in the proportional pressure that is being delivered by the relay through conduit 3 to chamber 2 of unit A. While this latter mentioned flapper action takes place, a second response resulting from an unbalance existing between the liquids in the two bellows 18, 18' due to the initial increased pressure on the left hand bellows 18 is effected to restore the bellows to a position of equilibrium. This equilibrium position is obtained by allowing the unbalance in pressure between the two bellows to cause a flow of fluid from the left hand bellows 18 through the conduit 25 and this flow of fluid to allow the two inner bellows 22, 22', thrust rod 10 and the arm 9 to start moving back to the left. While this occurs the pin 127, link 118 and pin 129 will be rotated in a counter-clockwise direction so as to allow the spring 6' to slowly return the flapper 6 toward the nozzle. This action provides a means of changing the pressure on the control valve even though the thrust rod and arm 122 of the S.P.-M.V. unit remains stationary.

The unit A is so adjusted that when the M.V. pressure equals the control point pressure the pressures between the two bellows 19, 19' will be equal and no liquid will flow. If the M.V. pressure fails to return to the value of the set point pressure an automatically reset action will be effected in which the liquid will continue to flow between the bellows 19 and 19', gradually moving the control valve 8 to a wide open position in an effort to get the M.V. pressure back to the S.P. pressure.

The rate at which this automatic reset action takes place will depend on the effect that the current passing through the coil 26 has on the suspended particles in the liquid passing through the conduit 25. By turning the knob 32 in the desired direction, the current flowing through the coil 26 may be increased or decreased so as to effect a greater or less magnetizing effect on the particles in the fluid flowing through conduit 25.

A temperature compensating circuit comprising the element 34, 35, 36, 36', 37, 38, 38', 38², 40, 41, 42, and 42' is shown tied in with the branch 28 of the circuit 26—33 that regulates the flow of current to the reset coil 26. The function of this temperature compensating means is to modify the flow of current to the coil 26 in such a way that the flow of current, determined by the setting of knob 32 passing through the reset coil 26 will not be altered upon a change in ambient temperature surrounding the controller A.

In the control of certain processes wherein it is not desired to get the M.V. pressure back to the level at which the S.P. pressure is set, the knob 32 may be rotated to the position where the current passing therethrough bypasses 30 so that the controller A may be operated without the aforementioned automatic reset action.

The form of the invention illustrated in Fig. 1 may be modified in various ways and for various purposes. One modification, shown in Fig. 2 is characterized by the addition to the apparatus shown in Fig. 1, of means for producing a non-linear reset action in the basic control unit shown in Fig. 1. In Fig. 2, the conduit 25 of Fig. 1 is surrounded by a coil 50 as well as by the coil 26 of Fig. 1. The coil 26 of Fig. 2 has leads 27 and 28 which may be associated with the current source 29 alone or with the other elements 30 to 42 inclusive and 42', shown in Fig. 1. Fig. 2 discloses an arrangement similar to that shown in Fig. 1 and having in addition thereto a non-linear reset response circuit 49 including the elements 50 to 64.

The coil 50 has lead conductors 51 and 52 which are connected across a direct current source 53. An appropriate switch such as switch 51a, is inserted in the lead 51 of this non-linear response circuit 49 so as to provide a means of cutting out the reset rate modifying effect that this circuit has on the controller A. As shown, the lead 51 is connected to the positive side of the current source 53 through a condenser 54 and a variable resistor 55 in parallel with the condenser. The lead 52 is connected to the negative terminal of the current source 53 through a variable resistor 56 and through two potentiometer resistors 57 and 58 connected in parallel with one another between the variable resistor 56 and the negative terminal of the current source 53. A resistor 59 also connects the positive terminal of the current source 53 to the end of the variable resistor 56 which is directly connected to the negative terminal of the current source 53 through the resistors 57 and 58. The resistors 57 and 58 are in contact with wiper contacts 60 and 61, respectively. The wiper contact 60 is connected by a conductor 62 to the left end of the resistor 57. The wiper contact 61 is directly connected to the right end of the resistor 58. The wiper contacts 60 and 61 are pivotally connected to the drawbar 64 and this drawbar in turn is fixedly attached to the arm 122 so that as the pressure in the conduit 17 increases, the contacts 60 and 61 move along the resistors 57 and 58 in the direction to increase the amount of resistance in the resistor 57 which is not short circuited by the conductor 62, and to decrease the effective length of the resistor 58 which is short circuited by the conductor 63. A decrease in the pressure in the conduit 17 produces reverse effects.

An advantage of the non-linear reset action attained by the adjustment of the wiper contacts 57 and 58, is that for sudden large changes in the pressure transmitted through the pipe 17, in response, for example, to a substantial load change, the reset rate is made relatively large initially and is then allowed to reduce automatically as the variable approaches the set-point value. With the described arrangement of the elements 57—63, a sudden movement of the drawbar 64 in either direction causes one or the other of the two potentiometer resistors 57 and 58 to be short circuited and thereby creates a surge of current through the resistance-capacity components of the flux-producing circuit including the coil 50.

For clarity, the coil 50 of this flux-producing circuit is shown wrapped around the conduit 25 to the right of and in the opposite wound direction to that of the coil 26. In a practical embodiment of this apparatus, the coil 50 will be superimposed on the reset coil 26 in such a way that the current flowing through the coil 50 will be in the opposite direction to the current flow passing through the coil 26. The schematic showing of these coils in this Figure 2 indicate that the current passing through the coil 26 is flowing in a right to left direction while the current passing through the coil 50 is flowing in a left to right direction.

When a current passes through the coil 26 a magnetic field will be created on the inside of the coil which will be of uniform strength and which will act parallel to the axis of the coil. When another current is applied to the coil 50, a magnetic field will be created on the inside of this coil which field will also be of uniform strength and act in a direction parallel to the axis of the coil. Because the direction of the current flow through the coils 26 and 25 are in opposing relationship to one another, the magnetic field in the latter mentioned coil will tend to buck out the magnetic field of the coil 26 in accordance with the well known "right hand rule" of electricity. This bucking out action has the effect of momentarily making these magnetic fields being produced by the coil 26 ineffective and hence speeds up the rate at which reset control action is taking place. This bucking out effect is a particularly valuable control action when a substantial load change is imposed upon the system as will be explained in more detail under the description of Figure 7. The magnitude and duration of the current surges or flow through the coil 50 are dependent on the desired R-C relation set-up.

The results of this non-linear reset circuit is best illustrated in Fig. 7 wherein the line b—e represents a steady state reset rate which may be obtained for a selected position of the reset dial 32 shown in Fig. 2. The amplitude to which the reset rate will immediately soar when a substantial sudden load is imposed upon the system is represented by the line f—g. The maximum amplitude to which this reset value will rise will be dependent upon the adjustment of resistance 56 shown in the circuit e.g. in Fig. 2. The selected R-C values will govern the length of time that will be required to automatically reduce reset rate from its maximum value d back to the point e, on the steady reset rate line b—e.

b—c of the graph shown in Fig. 7 may also be thought of as being representative of a steady current, c—d as a sudden surge in current and d—e as a decay in the current flowing through the reset coil 50 shown in Fig. 2.

The zero (0) time value shown in Fig. 7 represents the instant a step change, resulting from a sudden load change, is imposed upon the steady state reset rate such as is existent from the point b to the point c.

As will be apparent, the result just described can be obtained by other arrangements and movements of the wiper contacts 60 and 61 relative to the back-to-back potentiometer resistors 57 and 58. It can thus be seen that the variable resistor 56 may be adjusted to modify the magnetizing effect that the variable M.V. has on the coil 50 whereas the setting of 55, 54 determines rate at which the strength of the field in coil 50 is changed with rapid changes in the controlled variable pressure M.V. The variable resistor 55' may be adjusted to control the noise effect in the energizing circuit of the coil 50. With means for independently adjusting the resistances of the resistors 55' and 55 it is possible to discriminate between the effects of random noise and of rapidly fluctuating load changes. In some cases it may be desirable to filter out the noise while keeping the system sensitive to rapidly fluctuating loads. Adjustment of the resistor 55 sets the boundary of sensitivity to the frequencies to which the circuit including the coil 50 is subjected by placing different values of resistance in series with the capacitor 54. The control adjustment of the resistor 56 may be adjusted to maintain a desired residual current flow through the coil 50 during periods of controller balance.

The operation of the control apparatus shown in Figure 2 has not only all of the proportional plus reset control features as already explained under the operation of Figure 1, but also a non-linear response circuit 49.

When a substantial step change in the value of the flow passing through the orifice 145 occurs in the control apparatus of Figure 2, this change is transmitted to the differential pressure receiving and transmitting means 143 in the form of an increase in the difference between the high and low pressure of the fluid flowing through the conduits 146 and 147. The differential pressure receiving and transmitting means 143 in turn transmits an increase M.V. pressure signal proportional to this increased pressure difference through the conduit 17 to the chamber formed by the external surface of the bellows 13 and the casing 16. This increase in M.V. pressure acts to move the bellows 13, thrust rod 11, arm 122, and drawbar 64 of the non-linear response circuit 49 to the left against the force of a set point pressure in the chamber between the bellows 12 and casing 14. The movement of the drawbar 64 causes a residual current which is flowing through the coil 50 of the non-linear response circuit to be instantaneously increased. This latter action will nullify to a predetermined extent the magnetizing effect that the current passing through the coil 26 has on the reset rate of the control unit A. When this instantaneous non-linear circuit action takes place, the speed at which the reset action of control unit A takes place will be increased momentarily by a momentary increase in the current flow from the non-linear response unit 49 to and through the coil 50. As this increase in reset rate control action takes place the fluid in the bellows 19, 19' and the passageway 25 is rapidly moved to the left in order to return the thrust rod 10, arm 9 and flapper 6 toward the position they were in before the step change occurred. This action will cause the link 118 and pin 129 attached thereto to move in a counter-clockwise direction about pin 119. This latter mentioned action permits the spring 6' to move the flapper 6 away from nozzle 5. The movement of the flapper in this manner will thus neutralize, to a predetermined extent, the effect that the initial effect that the step change in M.V. pressure had on follow-up pressure. During that initial action the force of this follow-up pressure from the relay 4 was employed on the external surface of the bellows 19' and the liquid therein to move the internal bellows unit 22', 22, and thrust rod 10 to the right.

Because this aforementioned motion moved the flapper 6 toward the nozzle 5, the pressure being transmitted to the pilot 4 by conduits 5', 7' is increased and this pressure in turn causes the pilot valve to transmit a proportionally greater pressure through the conduit 8' to the control valve 8. The action of the pressure flowing through conduit 8 to control valve 8 will act to restrict the flow of fluid through the conduit 144. This action will in turn cause a reduction in the flow of the fluid that can pass through the orifice 145. The differential pressure across this orifice 145 carried respectively by the conduits 146 and 147 to transmitter 143 will likewise be reduced. When the transmitter 143 senses a drop in the pressures across the orifice 145, its output M.V. pressure that it delivers through the conduit 17 to the chamber between the casing 16 and bellows 13 will likewise be reduced proportionately. As this reduction in M.V. pressure takes place, the thrust rod 11 will be forced to the right by the S.P. pressure acting on the bellows 12. As thrust rod 11 is moved gradually towards the right, the arm 122 and its associated drawbar portion 64 will likewise be moved in the same direction. As arm 122 is moved toward the right by thrust rod 11 the link 118 and the pin 129, mounted thereon will be moved in a counter-clockwise direction about the pin 127. The action of this pin will thus effect a flapper action which will in turn decrease the pressure about the pin 127 delivered by the relay 4 through the follow-up conduit 3 to the chamber 2' of control unit A. This decrease in pressure in chamber 2' will cause further reset control actions to take place in the control unit A so as to cause the flapper 6 to be moved to such a position that the flow of fluid through the conduit 144 will be lined out at the predetermined S.P. pressure.

As this lining out action is occurring, the resistance and capacitance of the non-linear circuit 49 will gradually wipe out the effect that the circuit 49 has on the magnetic field of coil 26. This gradual wiping out action will take place in a non-linear manner as shown by the curve in Figure 7 of the drawing.

From the aforementioned description of the operation of the control apparatus shown in Figure 2 it can be inferred that under normal conditions the reset control action of this apparatus will be similar to the reset control action that is obtained with the control apparatus shown in Figure 1. It can also be inferred that the non-linear response apparatus shown in Figure 2 will provide a more optimum control of the flow of fluid passing through the flow line 144 during a time in which a substantial sudden load change occurs than would be possible by the control apparatus of Fig. 1.

Fig. 3 illustrates another form of the present invention in which use is made of an electro-magnetic liquid in a feed back circuit of an air controller instrument A which may be exactly like the instrument A of Fig. 1, except for the manner in which the air pressure in the chamber 2 is varied in response to pressure changes in the pilot valve or relay 4. In Fig. 3, the relay chamber 4 is connected to the chamber 2 of the instrument A through a feed back circuit which includes an element B structurally similar in most respects to the controller instrument A. The element B comprises end chambers 70 and 71 analogous to the end chambers 2 and 2', respectively, of the instrument A. The chamber 70 is not open to the atmosphere, as is the chamber 2' of Fig. 1, but is in communication with the relay chamber 4 through a pipe 72. The chamber 71 is connected to the chamber 2 of the associated instrument A by a pipe 73. The chambers 70 and 71 enclose bellows elements 74 and 75 respectively analogous to the bellows elements 19' and 19 of the instrument A, and having their interiors connected by a conduit 76. As shown, however, the adjacent stationary walls 77 and 77' of the bellows elements 74 and 75 and of the chambers 70 and 71 are solid with exception of the apertures through which the ends of the conduit 76 communicate with the chambers 74 and 75.

In Fig. 3, use is made of a feed-back circuit which includes a housing 1a enclosing end chambers 70 and 71. Air pressure variations in the relay 4 are transmitted to the chamber 70 through a pipe 72 and fluid pressure in the chamber 71 is transmitted through the pipe 73 to the chamber 2 of the instrument A. Changes in the fluid pressure in the chamber 71 occur as the magnetic fluid flows between bellows 74 and 75 through conduit 76. The delay caused by the restrictive effect of the electrical circuit 78–82 inclusive at 76 provides a delayed feedback action in the controller and an overall rate action in the controller output pressure. The conduit 76 is surrounded by a coil 78 of this electrical circuit which has one lead 79 directly connected to the positive terminal of a source of D.C. current shown as a battery 82. The other lead 80 of the coil 78 is connected to the negative terminal of the battery 82 through a variable resistor 81.

In the operation of the apparatus shown in Fig. 3, the air pressure in the bleed nozzle 5 is varied not only by the movement of the thrust rod 11, but also by the air flow into and out of chamber 2 which actuates thrust rod 10 as the liquid flow through the conduit 76 increases or decreases the volume of the liquid filled chamber 75.

When a sudden increase in the flow of fluid through the conduit 144 of the control apparatus shown in Figure 3 occurs at the orifice 145, the differential pressure receiving and transmitting means 143 as previously described will send out an increased M.V. pressure signal to the chamber formed by the walls of bellows 12 in casing 14. When this occurs the bellows 12 will be forced, along with its thrust rod 11, arm 122, and pin 117 to the left. The movement of the pin 117 will in turn permit link 118 and pen 129 to be rotated in a clockwise direction about the pin 127 so that the spring 6' may act on the flapper to move it toward the nozzle 5. This flapper action in turn will cause a greater pressure to be transmitted to the pilot valve 4. The pilot valve in turn to transmit a proportionately increased output pressure to the control valve 8 by way of the conduit 8'. This output pressure is also sent through the conduit 72 to the chamber 70 of rate unit B so as to introduce an additional control action called rate action in the apparatus shown in this figure. As this increased pressure is applied to the chamber 70, the bellows 74, containing a magnetizable fluid therein, will be compressed. This compressing action will cause the magnetizable fluid in the bellows 74 to move through the conduit 76 to bellows 75 and expand the bellows 75 in a rightward direction. This expansion of the bellows 75 will in turn cause the pressure within conduit 73 and hence chamber 2 of unit A to be increased.

Because the pressure change in this chamber 2 is brought about by allowing the effect of the increased output pressure of the pilot valve to be transmitted through the liquid inside bellows 74, conduit 76, and bellows 75, the pressure applied to chamber 2 will have a different effect on the controller A of Figure 3 than it would have if the pilot output pressure was applied directly from the pilot valve to the chamber 2, as is the case with the control apparatus as shown in Figure 1. One effect the rate unit B will have on control unit A is that the reset rate of control unit A will be materially increased. In other words, the number of times per minute that the control valve is proportionally positioned by the proportional speed floating action of control unit A will be materially increased.

As this rate action materially increases reset rate there will be introduced into the control unit A a control action which will minimize the extent to which the control unit can deviate from its set point during certain substantial upsurges in the flow passing through the conduit 144. The control action introduced by the rate unit B of the control apparatus shown in Figure 3 will thus give this control apparatus a much greater stabilizing control effect than can be afforded by the control apparatus shown in Figure 1.

In view of the aforementioned description of Figure 3, it is evident that when the rate unit B in Figure 3 is tied in with a controller having a proportional plus reset action such as control unit A in Figure 1 in such a manner that the rate action is allowed to take effect before automatic reset action the following advantageous results will be realized: the action of the rate unit will considerably reduce the tendency of the controller to deviate from the set point when upsets, load changes, or disturbances occur in the process being controlled and second, the time required to stabilize the process is materially reduced.

These advantages are made possible because the rate unit acts in such a manner as to send an advanced output control pressure signal to the control unit A which signal acts to advance the time required for a conventional control response of unit A. Since this amount will not be effected by a change in speed at which the magnitude of the M.V. pressure is being altered, it will continue to send its advance control signal to control unit A.

Furthermore, this rate unit B shown in Figure 3 is provided with a variable resistor 81 for changing the amount of time required to make such an advance in the normal control responsive unit A. The apparatus shown in Fig. 3 may thus be combined with the desirable features shown in Fig. 1 to produce a controller having a remote adjustment of reset rate, rate time, and temperature compensation. In a like fashion, the non-linear reset response circuit illustrated by circuit 49 in Fig. 2, although not shown in Fig. 3, be combined with the other control functions shown in Fig. 3 if such response circuit is so desired.

Fig. 3A shows a manually adjusted permanent magnet 131 that may be used as an alternative way of adjusting the reset rate settings of the control unit A e.g. as shown in Fig. 1. The arrangement shown in Fig. 3A may also be used as an alternative way of procuring the same result that is derived from the rate time circuit 78–82 shown in Fig. 3.

This alternative reset or rate time circuit is comprised of a permanent magnet 131 of an inverted Y-shape configuration which has a portion 132 slidably mounted in a fixedly mounted guide means 133, 136 and has another portion 134 of a rack tooth configuration. This rack 134 may be moved in a downward direction by rotating gear knob 135a of a gear segment 135b in a clockwise direction. The lower inverted U-shaped portions 137, 138 of magnet 131 when in this lowered position will increase the viscosity of the fluid inside the conduit 76. This viscosity increase will thus retard the speed at which the magnetic fluid flows through the conduit 76.

If it is desired to neutralize this permanent magnet effect in accordance with the temperature of the atmosphere surrounding the control unit, a fluid filled temperature sensing system may be employed. Such a system as shown in Fig. 3A can be comprised of a bulb 41a, conduit 42a, bellows 139, and a non-magnetized ferrous plate 140. As the temperature surrounding the control unit is increased the fluid in the bulb and the entire filled system will expand. This fluid expansion will force the bellows and non-magnetic plate 140 attached thereto to move in an upward direction. As the upper ends 141 and 142 of the plate 140 are moved in this manner they will minimize the effect that the magnet 131 has on the fluid flowing through the capillary 76.

Fig. 4 illustrates a form of the invention in which conjoint use is made of the non-linear rate action similar to the non-linear reset action provided for in Fig. 2, and of the feed back action illustrated in Fig. 3. The element C of Fig. 4 is like the element B of Fig. 3 in having end chambers 70 and 71 with pipe connections 72 and 73. The element C of Fig. 4 differs in form from the element B of Fig. 3, in that the chambers 74 and 75 of Fig. 3 are replaced in Fig. 4 by chambers 90 and 91 which have their adjacent stationary end walls 92 and 93 formed with central apertures closed by bellows elements 94 and 95 extending into the chambers 90 and 91, respectively. The elements 94 and 95 are similar to the Fig. 1 elements 22 and 22, respectively, and are connected by thrust rod 10a. The spring action of bellows 94 and 95 under conditions of changing pressure in chamber 71 results in a compensated rate action as compared to uncompensated rate action provided by unit B in Fig. 3. The chambers 90 and 91 are connected by a conduit 96 similar in structure and operation to the conduit 76 of Fig. 3. As will be apparent, an increase in the pressure in the associated relay chamber 4 tends to decrease the volume in the chamber 71 of Fig. 4 by the expansion of the chamber 91 due to the flow into that chamber through the conduit 96, and by the increase in the length of the bellows element 91 resulting from the elongation of the bellows 95 produced by the action of the thrust rod 10a. As this occurs the spring action of the bellows 94 and 95 tend to limit the rate amplitude of unit C.

The conduit 96 is surrounded by separate coils 97 and 101. Although not shown, one lead 28' of the coil 97 is directly connected to one terminal of a direct current source 29 through two resistors 34 and 35, in the same manner as is lead 28 shown in Fig. 1. Although not shown another lead 27' of the coil 97 is connected in series with a variable resistor 30, to the second terminal of a current source 29 in the same manner as is lead 27 shown in Fig. 1. The block into which the leads 27' and 28' are shown connected, in Fig. 4, also contains, although not shown, the temperature compensating circuit shown in Fig. 1.

The lead 102 of the coil 101 is directly connected to the positive terminal of the direct current source 103. The second lead, 104, of the coil 101 is connected to the terminal of the current source 103 through elements 105, 106, 107, 108, and 109.

Fig. 4 also shows a condenser 54a in series with a resistance 55a. With this conjoint arrangement the condenser 54a will provide a means of shorting out voltages across the coil and the adjustment of the variable resistor 55a will provide a means of controlling the noise effect which may be present in this energizing circuit. The elements 106 and 107 are a condenser and a variable resistor, respectively, utilized to make the system insensitive to random noise inherent in the process. The elements 108 and 109 are slide wire resistors connected in parallel with one another. The wiper contact 110 engages and is adjustable along the slide wire resistor 108, and the wiper contact 111 engages and is adjustable along the slide wire resistor 109.

As shown diagrammatically in Fig. 4, the wiper contacts 110 and 111 are pivotally connected by means of a drawbar 112 of the arm 122. The wiper contact 110 is connected by a conductor 113 to the end of the resistor 108 relatively remote from the current source 103, and the wiper contact 111 is connected to the current source 103 by a conductor 114. As the link 118 is moved to the right the portion of the resistor 108 short circuited by the conductor 113 is increased and the portion of the resistor 109 short circuited by the conductor 114, is decreased. The overall operative effect of the adjustment of the wiper contacts 110 and 111 along the resistors 108 and 109, respectively, is thus similar to the adjustment of the wiper contacts 60 and 61 along the resistors 57 and 58, respectively, of Fig. 2. The elements 101–114 thus form a circuit arrangement 49A generally like the arrangement 49 of Fig. 2.

The non-linear response circuit 49A shown in Fig. 4 functions as it does when included in the arrangement shown in Fig. 2. In Fig. 4, however, instead of effecting reset rate, the non-linear response circuit effects rate time in accordance with changes in the magnitude of the offset or difference between the set point and measured variable values.

When a sudden load change in the process being controlled by the control apparatus shown in Figure 4 occurs, and a resulting sudden increase in flow of fluid passing through the conduit 144 is realized by the differential receiving and transmitting means 143, the M.V. pressure delivered by the transmitting means 143 to the chamber between the bellows 13 and casing 16 will be increased. This pressure will act to move the bellows 13, thrust rod 11, and arm 122 to the left against the force of the S.P. pressure acting on the bellows 12. As this movement takes place the link 118 carrying the pin 129 will be moved in a clockwise direction about the pin 127. The movement of the pin 129 in this manner will permit the flapper to be moved closer to the nozzle by the spring 6'. This flapper movement will in turn cause the pressure being transmitted to the pilot valve 4 by the conduits 5', 7' to be increased. The pilot valve 4 will then act to transmit a proportionally greater pressure to the control valve 8 through the conduit 8' so as to effect an immediate reduction in the flow of fluid passing through the flow line 144. The output pressure of the pilot valve 4 is also transmitted to the chamber 70 of rate unit C by way of the conduit 72. As this increased pressure is fed into chamber 70, the large bellows 90 and the fluid therein will be compressed in a left to right direction. The immediate effect of this fluid force will be disspelled by the movement of the inner bellows unit 94, 95 and connecting rod 10a to the right. The immediate effect of this latter action will be to force the magnetic liquid between bellows 91 and 95 against the movable end of the bellows 91. The expansion of the bellows 91 will cause the fluid pressure in chamber 71 and hence conduit 73 and chamber 2 of control unit A to be compressed. The force of this latter mentioned pressure will move the bellows 19, the magnetizable liquid therein, and the movable rod 10 of the inner bellows 22, 22' in a leftward direction. As this leftward movement takes place the thrust rod 10, arm 9, and the upper portion of the link 118 will likewise be moved in the same direction. As the upper portion of the link 118 is moved toward the left the pin 129 will be moved in a counter-clockwise direction about the pin 119. As this initial movement of the pin 129 occurs the spring 6' will be permitted to move the flapper 6 towards the left, or toward the nozzle 5. This flapper action will have the affect of increasing the pressure in conduit 5' and 7' that is being transmitted to the pilot valve 4. The pilot valve will in turn act to increase the pressure that it is transmitting through the conduit 8' to the control valve 8 so as to permit a slight additional decrease in flow through the conduit 144 than was effected by the initial movement of the arm 122. This increased pilot valve pressure is also realized by the conduit 72.

While the rate unit C acts to move the inner bellows 22, 22' and thrust rod in a leftward direction, the difference in pressures of the magnetizable fluid inside the bellows 19, 19' will cause this fluid to move in a right to left direction and then in a left to right direction through the conduit 25 to restore the control unit A to its state of equilibrium.

As this latter action known as reset action takes place the movement of the thrust rod 10, arm 9, link 118, pen 129, and flapper 6 will be such as to adjust the bleed nozzle pressure being sent to the control valve to such a level that the pressure output of the pilot valve 4 acting on the control valve will tend to regulate the flow through the conduit to such a value that it is equal to the predetermined set point pressure S.P.

The rate at which this automatic reset action takes place will depend on the effect that the current passing through the coil 26 has on the suspended particles in the liquid moving through the conduit 25. By turning the knob 35, as shown in Figure 1, the current flowing through the coil 26 shown in Figure 4 may be increased or decreased so as to affect a greater or less magnetizing effect on the particles in the fluid flowing through the conduit 25. The block connected to the terminal ends of the leads 27, 28 may also have a temperature compensating circuit such as temperature compensating circuits 34, 35, 36, 36', 37, 38, 38', 38², 40, 41, 42, and 42' shown in Figure 1. A similar control of fluid flow can be affected in the magnetizable fluid flowing through the conduit 96 of the rate unit C by passing a current through the coil 97. Although not shown, the block connected at the terminal end of the leads 27, 28 may be provided with an apparatus identical to that shown connected to the ends of the leads 27, 28 in Figure 1 of the drawings.

For clarity, the coil 101 of a non-linear flux producing circuit is shown wrapped around the conduit 96 to the right of and in the opposite wound direction to that of coil 97. In a practical embodiment of this apparatus, the coil 101 will be superimposed on the coil 97 in such a way that the current flowing through the coil 101 will be in the opposite direction to the current passing through the coil 97. The schematic showing of these coils 97, 101 in this Figure 4 indicate that the current passing through the coil 97 is passing from right to left while the current passing through the coil 101 is flowing in the left to right direction.

When a current passes through the coil 97 a magnetic field will be created on the inside of the coil which will be of uniform strength and which will act parallel to the axis of the coil. When another current is applied in the coil 101, a magnetic field will be created on the inside of this coil which field will also be of uniform strength and act in a direction parallel to the axis of the coil. Because the direction of the current flow through the coils 97 and 101 are in opposing relationship to one another, the magnetic field in the latter mentioned coil will tend to buck out the magnetic field of the coil 97 in accordance with the well known "right-hand rule" of electricity. This bucking out action has the effect of momentarily making this magnetic field, being produced by the coil 26, ineffective and hence alters the rate time of the unit in a manner similar to the way the adjustment of the variable resistor does in the control apparatus of Figure 3.

Furthermore, when the drawbar 112 of arm 122 has been moved to the left, upon a sudden increase in the flow through the conduit 144, the non-linear response circuit 49A will be activated to such a position that a momentary increase in current will flow through the coil 101. This increase in current in the coil 101 will nullify the effect that the field of coil 97 has on the magnetizable fluid flowing through the conduit 96. This action will give the same type of increase in rate time that would be derived if the current flowing through the coil 97 were suddenly increased. This increase in rate time can be visually realized by observing the rate time rise from $i$ to $j$ of Figure 8.

By applying properly selected R.C. values to the variable resistor 107 and capacitor 106 of the non-linear response circuit 49A it is possible to introduce a time function which will cause the rate unit C to govern the time it will take, after the aforementioned immediate rise in rate time, to bring rate time back to a steady state, or, in other words, to the state rate time was in before the sudden increase in the flow through 144 took place.

Rate time administered to the control apparatus in the aforementioned manner will thus provide a means of advancing considerably the time that the control unit A would normally take to automatically effect a control pressure change on a control valve upon a sudden substantial change in the flow of a fluid in a flow line as well as a means which will automatically act to reduce this advanced time as this flow is brought back to a predetermined set point value.

The results of this non-linear response circuit is best illustrated in Fig. 8 wherein the line $h, k$ represents a steady rate time which may be obtained for a selected position of the variable resistor 30 of Fig. 4. The minimum rate amplitude to which rate time will be raised, when a substantial sudden load is imposed upon the system, is represented by the line $l, m$. The minimum amplitude to which rate time will drop will be dependent upon the R–C values in the lon-linear circuit shown e.g. in Fig. 4. The selected R–C values will also govern the length of time that will be required to automatically decrease rate time from its maximum value $j$ back to the point $k$, on the steady rate time line $h$—$k$, as the variable approaches the set point value.

$h$—$i$ of the graph shown in Fig. 8 may also be thought of as being representative of a steady current, $i$—$j$ as a sudden surge in current and $j$—$k$ as a non-linear decrease in current flowing through the coil 101.

The zero (0) time value shown in Fig. 8 represents the instant a step change, resulting from a sudden load change, is imposed upon the steady state rate time such as is existant from the point $h$ to the point $i$.

Fig. 5 diagrammatically shows a combination of the apparatus illustrated in Fig. 4 with the addition of a second magnetizing circuit means 49b for increasing or decreasing the effect of the reset action in a manner similar to that effecting the reset action of the unit 49 shown in Fig. 2. One lead 28 of the coil 97 of Fig. 5 is directly connected to one terminal of a source of direct current 29 through two resistors 34, 35, not shown, in the same manner as shown in Fig. 1. Another lead 27 of the coil 97 is connected in series with a variable resistor 30 to the second terminal of the current source 29 in the same manner as lead 27 shown in Fig. 1. The block into which the leads 27 and 28 are shown connected to, in Figs. 4 and 5, also may contain, although not shown, the temperature compensating circuit which is shown in Fig. 1. The coil 101 of the element C of Fig. 5 forms part of a circuit arrangement 49c which may be exactly like the circuit arrangement 49A of Fig. 4, except that the wiper contacts 110 and 111 of Fig. 5 are connected by a member 112a to the drawbar 64 that in turn connects the wiper contacts 60 and 61 of the circuit arrangement 49b to the arm 122. Fig. 5 thus introduces a single linkage 64 to provide the apparatus shown in Fig. 4 with a second magnetizing circuit means for increasing or decreasing the effect of the Fig. 5 reset adjusting coil 26 in the same manner as that shown in Fig. 2.

When a sudden load change in the process being controlled by the control apparatus shown in Figure 5 occurs, the rate unit C will effect a control action identical to that as already explained under the operation of Figure 4 and the current flowing through the coil 26 will be used to effect a reset rate in a manner identical to that already described under the operation of Figure 4. The only additional control feature that Figure 5 has over Figure 4 is that a non-linear response circuit 49b including the coil 50 is added to provide a non-linear control action which will influence the reset rate of controller A in the same manner as set out in the description of the non-linear response circuit 49 of Figure 2.

It can thus be seen that the control apparatus of Figure 5 combines the advantages of the non-linear response circuit features, as shown in Figure 8, which the control apparatus of Figure 4 contains, with the advantages of the non-linear response circuit features as shown in Figure 7, which the control apparatus of Figure 2 contains. Furthermore, it can thus be seen that with this Fig. 5 arrangement, that both reset and rate control is made more sensitive to the magnitude and rate of deviation of the control variable, and more complete flexibility of adjustment of each of these modes of control is made possible.

Fig. 6 shows a combination of control units interconnected with a linkage system to give the effect of rate action ahead of the proportional and reset modes of control. This gives the characteristics required for start-up as needed, for example, in batch process work. Although slightly rearranged, the system is the same as that shown in Fig. 2 except that a rate relay D has been added. The measured variable is fed into the left end of the rate unit and the mechanical output is linked in any conventional mechanical way such as by a link 115 and link pin 129' to the flapper-nozzle system 5, to accentuate flapper movement during changes in the measured variable. As this mechanical output link motion becomes large, larger changes in the controlled output pressure will also be realized. Depending upon the values of the rate time and noise control settings in the rate circuit, movement of this mechanical (output) linkage may be dissipated either rapidly or slowly. Also depending upon process requirements, the rate relay could be set up with just one or both of the two component rate circuits. The non-linear rate circuit 49D as shown in Fig. 6 could also be represented as the non-linear rate circuit 49A shown in Fig. 4.

Fig. 6 diagrammatically illustrates a combination of control apparatus A with an instrument D. The apparatus A of Fig. 6 may be identical with the apparatus A of Fig. 1. The apparatus D includes a controller structure similar to the controller structure A shown in Fig. 1, but in Fig. 6 the pressure of the controlled variable M.V. is administered to the chamber 2 of the element D as well as to one end of the differential controlling device which is present in both of these figures. The conduit 25d connecting the chambers 19 and 19' of the member D is surrounded by coils 97 and 101 similarly to the coils 97 and 101 surrounding conduit 96 in the element C of Figs. 4 and 5. The coil 97 is also connected in series with a vairable rate time resistor 30 across a current source 29 as in Fig. 1. The electrical leads 27', 28', of coil 97 shown in Fig. 6 have connected thereto a temperature compensating circuit which is identical to the temperature compensating circuit parts attached to the electrical leads 27, 28 shown in Fig. 1. The coil 101 of the instrument D and the coil 50 of the control apparatus A are each connected in a circuit arrangement 49D which may be a duplicate of the circuit arrangement 49 of Fig. 2. Each pair of wiper contacts 60, 61 are shown in Fig. 6 fixedly connected to a drawbar 64 by a member 112b in the same way that member 112a of Fig. 5 connects its wiper contacts 60, 61 and 110 and 111 to its drawbar 64. However, in Fig. 6 the flapper 6 of element A is connected by linkage 115 to the link 118 of the element D in order to effect rate action ahead of automatic reset.

When the process being controlled by the control apparatus shown in Figure 6 is shut down, the fluid ceases to flow in the direction of the arrow through the conduit 144. This reduction in flow will cause a drop in the measured variable and the fluid pressure that is being transmitted by the differential pressure measuring and transmitting means 143 to the chamber formed by the casing 16 and bellows 13 and chamber 2 of the rate relay unit D. As this drop in M.V. pressure occurs, the set point pressure S.P. will be permitted to move the right end of the bellows 13, the thrust rod 11, arm 122, and pivot pin 117 of linkage 115 to the left. This pin movement will cause the link 115 to be rotated in a clockwise direction about the pivot pin 127. This action in turn will cause the pin 129' to move the flapper against the force of a compression spring 6a toward the nozzle 5. Also, after an instant of time after this drop in M.V. pressure occurs, the compressed spring 24 will be permitted to expand and move the left end of the bellows 19' to the right. This bellows force will in turn be transmitted through the liquid in bellows 19' and 22 to move the thrust rod 10, arm 9, and pin 127. As this rightward movement of pin 127 occurs the link 115 will be pivoted about the pin 117 in a clockwise direction to permit the pin 129' to move the flapper against the force of spring 6a still closer, than the aforementioned movement, toward the nozzle 5.

When the shut down of the process is completed, the aforementioned forces acting on the linkage 115 will have resulted in movement of the upper end of the flapper 6 to the intermediate, dotted line, position shown in Figure 6. Since the control valve pressure is locked in unit A's chamber 2, 2' during the shut down period, the lower end of the flapper 6 will remain in its aforementioned intermediate, dotted line position.

When the process being controlled by the control apparatus is started up the fluid will again start to flow in the direction of the arrows through the conduit 144. When this occurs, the force of the M.V. pressure acting on the bellows 13 and bellows 9 will be increased. The action of the pressure on bellows 12 will act in such a manner that the bellows 13, thrust rod 11, arm 122 and pivot pin 117 of linkage 115 are moved to the right against the force that the set point pressure is then exerting on the external surface of bellows 13. The difference between the M.V. and set point pressure will introduce another signal in the form of a mechanical motion through the thrust rod 11, arm 122, pivot pin 117, and linkage 115 to the flapper 6.

While this action is taking place, the rate relay D is also instantaneously introducing a motion which will move the pin 127 of link 118 on linkage 115 to the left.

As initial increases in measured variable pressure occur, the aforementioned M.V.-S.P. unit will affect movement of the flapper 6 from its extreme right or dotted line position to its perpendicular dotted line position. During the initial increases in M.V. pressure of S.P.–M.V. units of this type, the flapper will normally be moved closer to the nozzle 5 without effecting a change in the nozzle pressure that is being transmitted to the pilot valve 4. However, with the action of the rate relay as already explained, the initial position in which the flapper 6 will be positioned during shutdown is shown by the intermediate, dotted line, position, in lieu of the extreme right or solid line position shown in this Fig. 6.

The action of this rate relay D during shutdown will thus enable the linkage 115 to more rapidly move the flapper closer to the nozzle than would be possible with the use of the M.V.-S.P. unit 11—14, 122, 117 per se.

Another way of describing this action is that this rate unit provides a means by which the flapper can be brought into closer proximity to the nozzle before a variable, such as flow, has reached a predetermined set point value. As this small amount of flapper movement occurs the air pressure in nozzle 5 will be increased. This increased pressure is then transmitted by suitable conduits to regulatably increase the output fluid pressure of a conventional relay 4. The increased output pressure of this relay 4 in turn is transmitted to regulate a control valve 8 in such a fashion that the valve will be immediately positioned to effect, for example, a decrease in the flow of fluid through conduit 144. The amount of motion that will be transferred to the valve in this manner will be such that the magnitude of aforementioned flow will line out at a predetermining set point value at an instant of time after automatic start-up has taken place.

During an instant of time after the variable has been lined out with the set point and the increasing pressure of the M.V. has moved the bellows 19 of rate unit D to the left the liquid inside the bellows 19, 19' will be forced to move through the capillary 25d of this unit in such a fashion as to effect a control action which will move arm 9 back to its original position so that the effect that the initial movement of arm 9 had on the flapper 6 is wiped out.

The chamber 2 of reset unit A shown in Figure 6 receives changes in nozzle pressure 5 through relay 4. As the nozzle pressure is varied by the aforementioned movement of the valve 6 toward or away from the nozzle 5 the pressure in the nozzle will be varied between a minimum of three p.s.i. and fifteen p.s.i. A pressure between these maximum and minimum values is applied to a relay 4 which in turn transmits a pressure signal to the chamber 2 of reset unit A which signal is proportional to the pressure being transmitted by the nozzle to the relay 4. When this pressure signal enters the chamber 2 of reset unit A shown in Figure 6 it will effect a reset control action. This control action will be such that the thrust rod 10 will be ultimately moved to the right when the pressure signal is increased or be moved ultimately to the left when the pressure signal is decreased. The reason for this is that when, for example, a force derived from a sudden surge in pressure of a pressure signal occurs it will act on the exterior surface of bellows 19 and this force will be immediately transmitted to the liquid in bellows 19, 22 and passageway 25 to move the free end of the bellows 22 and thrust rod 10 to the right. The reason why this is possible is that since the liquid is being compressed at a faster speed than that at which it can be carried through the restricted passageway 25 to the right bellows chamber of a unit A the bellows 22 must be compressed and both the free end of the bellows 22 and the thrust rod 10 moves to the right to dispel the pressure signal force acting on the liquid. This control action is also of such a nature that after an instantaneous period of time after the rod has moved to the right the flow of fluid between the bellows 19 and 19' will be such as to attempt to restore the rod in a leftward direction to the position it was in before such movement took place. The aforementioned instantaneous period of time will be determined by the viscosity of the liquid inside the bellows 19 and this viscosity in turn dependent upon the magnetizing effect that the current flowing through reset coil 26 has on the magnetizable particles suspended in the liquid.

Under normal operation this automatic reset unit A shown in Figure 6 will act as a space balance means or a means which will tend to hold the flapper in space relative to the nozzle 5.

Fig. 6 shows a non-linear reset circuit which is electrically tied in with coil 50 of reset unit A in a manner similar to the way the electrical circuit 51—63 is tied in with this coil 50 as shown in Fig. 2. The rate time circuit 97, shown in Figs. 4, 5, and 6 is identical to the circuit shown in Fig. 1 and also contains the temperature compensation circuit also shown in the circuit of Fig. 1. In control applications that do not require temperature compensation the components 29—42 and 42' of the rate time circuit shown in Fig. 1 may be omitted.

Although not shown in Fig. 6, the lead 28' of the coil 97 of unit A is directly connected to one terminal of a direct current source 29 through two resistors 34 and 35 in the same manner as is lead 28 shown in Fig. 1. Although not shown another lead 27' of the coil 97 of unit A is connected in series with a variable resistor 30 to the second terminal of a current source 29 in the same manner as is lead 27 shown in Fig. 1. The block into which the leads 27' and 28' are shown connected, in Fig. 6, also contains, although not shown, the temperature compensating circuit shown in Fig. 1.

A major advantage of the non-linear reset action provided for herein, is that it automatically decreases the stabilizing effect of damping control for large upsets of the controlled variable and allows controlled damping of the controller response to take effect as the variable approaches the set point and thereby minimize overshooting.

A major advantage of non-linear rate action is that it institutes an instantaneous corrective action on the aforementioned disturbances and thereby dampens out the effect of these disturbances on the controlled variable.

While, in accordance with the provisions of the statutes, there has been illustrated and described the best forms of embodiment of the invention now known, it will be apparent to those skilled in the art that changes may be made in the forms of the apparatus disclosed without departing from the spirit of my invention as set forth in the appended claims and that in some cases certain features of the invention may be used to advantage without a corresponding use of other features.

Having now described my invention, what I claim as new and desire to secure by Letters Patent is:

1. In a control instrument of the known type comprising first and second chambers each having a flexible wall, a conduit connecting said chambers, said internal wall of said chambers acting as a means for holding a liquid with magnetizable particles suspended therein, means for subjecting said liquid in said first chamber to a variable compressive force, and means for subjecting liquid in said second chamber to a compressive force whereby liquid is caused to pass through said conduit into or out of said second chamber as the first compressive force is increased and decreased, means for subjecting liquid in said conduit to a magnetizing force which is regulable to vary the viscosity of the liquid in said conduit, said means comprising a conductor coiled about said conduit and having elongated extensions including a source of current and adjustable impedance, the latter being located at a distance from said control instrument and a thermistor in said conductor and means responsive to the ambient temperature surrounding the control instrument for increasing and decreasing the temperature of said thermistor as said ambient temperature increases and decreases.

2. Control apparatus comprising first and second control instruments each including first and second compressible and expansible chambers which are normally filled with liquid holding magnetizable particles in suspension, a separate conduit connecting the first and second chambers of each instrument, means for subjecting the first chamber of each instrument to a variable first compressive force and means for subjecting the second chamber of each instrument to a second compressive force opposing said first force and thereby causing liquid to pass through the conduit connecting the two chambers of each instrument on a variation in the relative values of said forces, a bleed nozzle connected to a source of air under pressure, a flapper valve controlling the outflow of air through said nozzle, means responsive to the difference between the pressures in the first and second chambers of said first instrument for adjusting said flapper valve relative to said nozzle in accordance with said difference, means for transmitting the bleed nozzle pressure to the first chamber of the second instrument, and means for transmitting the pressure in said second chamber of the second instrument to the first chamber of the first instrument, and separate means for subjecting the flow of fluid through each conduit to a regulable magnetizing force.

3. Control apparatus comprising first and second control instruments each including first and second compressible and expansible chambers which are normally filled with liquid holding magnetizable particles in suspension, a separate conduit connecting the first and second compressible and expansible chambers of each instrument, means for subjecting the first chamber of said first control instrument to a variable first compressive force and a means for subjecting the second chamber of said first control instrument to a second compressive force opposing said first force and thereby causing liquid to pass through the conduit connecting the two chambers of said first control instrument on a variation in the relative values of said forces, a bleed nozzle connected to a source of air under pressure, a flapper valve controlling the outflow of air through said nozzle, means responsive to the difference between the pressures in the first and second chambers of said first instrument for adjusting said flapper valve relative to said nozzle in accordance with said difference, means for transmitting the bleed nozzle pressure to the second chamber of the second instrument, and means for transmitting the pressure in said first chamber of the second instrument to the first chamber of the first instrument, and separate means for subjecting each conduit to a regulable magnetizing force.

4. Control apparatus comprising first and second control instruments each including first and second compressible and expansible chambers which are normally filled with liquid holding magnetizable particles in suspension, a separate conduit connecting the first and second compressible and expansible chambers of each instrument, means for subjecting the first chamber of said first control instrument to a variable first compressive force and a means for subjecting the second chamber of said first control instrument to a second compressive force opposing said first force and thereby causing liquid to pass through the conduit connecting the two chambers of said first control instrument on a variation in the relative values of said forces, a bleed nozzle connected to a source of air under pressure, a flapper valve controlling the outflow of air through said nozzle, means responsive to the difference between the pressures in the first and second chambers of said first instrument for adjusting said flapper valve relative to said nozzle in accordance with said difference, means for transmitting the bleed nozzle pressure to the second chamber of the second instrument, means for transmitting the pressure in said first chamber of the second instrument to the first chamber of the first instrument, separate means for subjecting each conduit to a regulable magnetizing force and means responsive to the difference between a variable pressure to be controlled and a set-point pressure for modifying the adjustment of said flapper relative to said nozzle which is produced by a given difference between the relative amounts of liquid in the chambers of said first instrument.

5. Control apparatus comprising first and second control instruments each including first and second compressible and expansible chambers which are normally filled with liquid holding magnetizable particles in suspension, a separate conduit connecting the first and second compressible and expansible chambers of each instrument, means for subjecting the first chamber of said first control instrument to a variable first compressive force and a means for subjecting the second chamber of said first control instrument to a second compressive force opposing said first force and thereby causing liquid to pass through the conduit connecting the two chambers of said first control instrument on a variation in the relative values of said forces, a bleed nozzle connected to a source of air under pressure, a flapper valve controlling the outflow of air through said nozzle, means responsive to the difference between the pressures in the first and second chambers of said first instrument for adjusting said flapper valve relative to said nozzle in accordance with said difference, means for transmitting the bleed nozzle pressure to the second chamber of the second instrument, means for transmitting the pressure in said first chamber of the second instrument to the first chamber of the first instrument, separate means for subjecting each conduit to a regulable magnetizing force and a control circuit including said separate means for subjecting the said liquid in the conduit of said second instrument to a regulable magnetizing action and thereby varying the viscosity of the liquid in the last mentioned conduit and the rate time of said instrument.

6. Control apparatus comprising first and second control instruments each including first and second compressible and expansible chambers which are normally filled with liquid holding magnetizable particles in suspension, a separate conduit connecting the first and second compressible and expansible chambers of each instrument, means for subjecting the first chamber of said first control instrument to a variable first compressive force and a means for subjecting the second chamber of said first control instrument to a second compressive force opposing said first force and thereby causing liquid to pass through the conduit connecting the two chambers of said first control instrument on a variation in the relative values of said forces, a bleed nozzle connected to a source of air under pressure, a flapper valve controlling the outflow of air through said nozzle, means responsive to the difference between the pressures in the first and second chambers of said first instrument for adjusting said flapper valve relative to said nozzle in accordance with said difference, means for transmitting the bleed nozzle pressure to the second chamber of the second instrument, means for transmitting the pressure in said first chamber of the second instrument to the first chamber of the first instrument, separate means for subjecting each conduit to a regulable magnetizing force and wherein a control circuit including said separate means comprised of a coil surrounding the conduit of said second instrument and is connected in series with a variable resistor to a source of direct current.

7. Control apparatus comprising first and second control instruments each including first and second compressible and expansible chambers which are normally filled with liquid holding magnetizable particles in suspension, a separate conduit connecting the first and second chambers of each instrument, means for subjecting the first chamber of said first control instrument to a variable first compressive force and means for subjecting the second chamber of said first control instrument to a second compressive force opposing said first force and thereby causing liquid to pass through the conduit connecting the two chambers of said first control instrument on a variation in the relative values of said forces, a bleed nozzle connected to a source of air under pressure, a flapper valve controlling the outflow of air through said nozzle, means responsive to the difference between the pressures in the first and second chambers of said first instrument for adjusting said flapper valve relative to said nozzle in accordance with said difference, a control pressure means operably controlled by said bleed nozzle pressure and means for transmitting control pressure changes to said first chamber of said first control instrument, means for transmitting said control pressure to the first chamber of the second instrument, and separate means for subjecting each conduit to a regulable magnetizing force.

8. Control apparatus comprising first and second control instruments each including first and second compressible and expansible chambers which are normally filled with liquid holding magnetizable particles in suspension, a separate conduit connecting the first and second chambers of each instrument, means for subjecting the first chamber of said first control instrument to a variable first compressive force and means for subjecting the second chamber of said first control instrument to a second compressive force opposing said first force and thereby causing liquid to pass through the conduit connecting the two chambers of said first control instrument on a variation in the relative values of said forces, a bleed nozzle connected to a source of air under pressure, a flapper valve controlling the outflow of air through said nozzle, means responsive to the difference between the pressures in the first and second chambers of said first instrument for adjusting said flapper valve relative to said nozzle in accordance with said difference, a control pressure means operably controlled by said bleed nozzle pressure, means for transmitting control pressure changes to said first chamber of said first control instrument, means for transmitting said control pressure to the first chamber of the second instrument, and separate means for subjecting each conduit to a regulable magnetizing force, a second separate means for subjecting said fluid in said conduit of said second control instrument to a second regulable magnetizing force to automatically superimpose a non-linear rate control action into said second control instrument.

9. Control apparatus comprising first and second control instruments each including first and second compressible and expansible chambers which are normally filled with liquid holding magnetizable particles in suspension, a separate conduit connecting the first and second chambers of each instrument, means for subjecting the first chamber of said first control instrument to a variable first compressive force and means for subjecting the second chamber of said first control instrument to a second compressive force opposing said first force and thereby causing liquid to pass through the conduit connecting the two chambers of said first control instrument on a variation in the relative values of said forces, a bleed nozzle connected to a source of air under pressure, a flapper valve controlling the outflow of air through said nozzle, means responsive to the difference between the pressures in the first and second chambers of said first instrument for adjusting said flapper valve relative to said nozzle in accordance with said difference, means for transmitting the bleed nozzle pressure to the first chamber of the second instrument, a separate means for subjecting each conduit to a regulable magnetizing force, and means for transmitting the pressure in the second chamber of the second control instrument to said first chamber of said first control instrument.

10. Control apparatus comprising first and second control instruments each including first and second compressible and expansible chambers which are normally filled with liquid holding magnetizable particles in suspension, a separate conduit connecting the first and second chambers of each instrument, means for subjecting the first chamber of said first control instrument to a variable first compressive force and means for subjecting the second chamber of said first control instrument to a second compressive force opposing said first force and thereby causing liquid to pass through the conduit connecting the two chambers of said first control instrument on a variation in the relative values of said forces, a bleed nozzle connected to a source of air under pressure, a flapper valve controlling the outflow of air through said nozzle, means responsive to the difference between the pressures in the first and second chambers of said first instrument for adjusting said flapper valve relative to said nozzle in accordance with said difference, means for regulating the viscosity of liquid in each of said conduits comprising a separate coil surrounding each conduit, means connecting each coil in circuit with a source of current and with a pair of potentiometers in parallel with each other and in series with said coil and current source, and wiper contacts associated with each pair of potentiometers for increasing the collective impedance of the corresponding pair of potentiometers on movement of said wiper contacts in either direction away from an intermediate portion of each resistor, and means for simultaneously adjusting the wiper contacts engaging each pair of potentiometers and thereby modify the compressive force acting on said first chamber of said first control instrument.

11. A control instrument of the known type comprising first and second compressible and expansible chambers, a passageway connecting said chambers, means for subjecting said first chamber to a variable compressive force of a variable pressure to be controlled and means for subjecting said second chamber to a compressive force and thereby causing a liquid in said chambers and passageway having magnetizable particles suspended therein to pass through said passageway into or out of said second chamber as the first compressive force is increased and decreased, and means for variably magnetizing said particles to thereby regulate the viscosity of the liquid passing through said passageway in accordance with a predetermined rate time, a control circuit comprising a conductor coiled about said passageway and having terminals connected to a source of current, and means for varying the impedance on said circuit, means responsive to an error signal measuring means that measures the difference between a variable pressure to be controlled and a set point pressure, a rate unit, a bleed nozzle, a flapper valve having one end actuated by a flapper valve actuating means and its other end by said rate unit, said nozzle and flapper valve being operable to regulate a control pressure output of a pilot valve, said control pressure being operably connected to the head of a control pressure actuated valve and a chamber of said rate unit, said rate unit comprising first and second compressible and expansible chambers, a conduit connecting said chambers, said last mentioned chambers and said conduit containing a magnetizable fluid with particles suspended therein, a connecting rod between said last mentioned first and second chambers, means for introducing a magnetic field in the fluid of said last mentioned conduit which varies in accordance with the difference between the ambient temperature surrounding the controller and a desired predetermined reset action, a second means for superimposing on said last mentioned magnetic field a non-linear reset rate action, a connecting rod between said chambers of said control instrument, said last mentioned connecting rod having one end pivotally connected to said flapper valve actuated means, an electro-mechanical means activated by said valve actuating means for introducing a magnetic field in the fluid in said conduit of said control instrument which field introduces a non-linear reset control action, said electro-mechanical means comprising a random noise restricting means, said control action of said control instrument, error measuring means and rate unit being such that rate action is introduced ahead of proportional and reset modes of control.

12. Control apparatus comprising first and second control instruments each including first and second compressible and expansible chambers which are normally filled with liquid, a separate conduit connecting the first and second chambers of each instrument, means for subjecting the first chamber of each instrument to a variable first compressive force and means for subjecting the second chamber of each instrument to a second compressive force opposing said first force and thereby causing liquid to pass through the conduit connecting the two chambers of each instrument on a variation in the relative values of said forces, a bleed nozzle connected to a source of air under pressure, a flapper valve controlling the outflow of air through said nozzle, means responsive to the difference between the pressures in the first and second chambers of said first instrument for adjusting said flapper valve relative to said nozzle in accordance with said difference, means for transmitting the bleed nozzle pressure to the first chamber of the second instrument, and means for transmitting the pressure in said second chamber of the second instrument to the first chamber of the first instrument, and separately operable means for subjecting the flow of fluid through each conduit to a fluid restricting force.

13. A control apparatus for obtaining optimum control of a variable during a sudden surge in the magnitude of said variable comprising the combination of a first means for producing a pressure which is proportional to the said magnitude of said variable, a second means operably connected to said first means for producing a mechanical motion which is equal to the difference between said pressure and a regulable set point pressure, a rate relay means operably connected to said first means to produce an instantaneous second mechanical motion only during said surge in said variable, a valve actuating linkage conjointly actuated at one of its ends by the said motion of said second and rate relay means, a flapper actuated bleed valve for producing a variably regulating control pressure in which a flapper is operably connected at one of its ends for movement with the other end of said valve actuating linkage, an integral acting control unit for fixedly positioning the other end of the flapper in a spaced balance manner with respect to said bleed valve, a pilot valve operably connected to said bleed valve to transmit a pressure signal that is proportional to said control pressure to a means controlling the magnitude of said variable and to said integral acting control unit, said pressure signal acting to effect a proportional plus automatic reset control action in said integral acting control unit.

14. An improvement in a control instrument comprising a first and second compressible and expansible chamber, a passageway connecting said chambers, means to effect a reset control action by subjecting said first chamber to a first variable compressive force and subjecting said second chamber to a second variable compressive force to cause a liquid in said chambers and passageway to pass through said passageway into or out of said second chamber as the first compressive force is increased and decreased, said improvement comprising the addition of magnetizable particles to said liquid and the addition of an electrical circuit to apply a magnetic field of a regulatable magnitude to said particles passing through said passageway to regulate the viscosity of the liquid flowing therethrough and to change the rate at which said reset control action takes place.

15. An improvement in a control instrument comprising a first and second compressible and expansible chamber, a passageway connecting said chambers, means to effect a reset control action by subjecting said first chamber to a first variable compressive force and subjecting said second chamber to a second variable compressive force to cause a liquid in said chambers and passageway to pass through said passageway into or out of said second chamber as the first compressive force is increased and decreased, said improvement comprising the addition of magnetizable particles to said liquid and the addition of an electrical circuit to apply a magnetic field of a regulatable magnitude to said particles passing through said passageway to regulate the viscosity of the liquid flowing therethrough and to change the rate at which said reset control action takes place, said electrical circuit including a control circuit comprising a conductor coiled about said passageway, terminals connected to a source of current, and a means to vary the impedance in said circuit.

16. An improvement in a control instrument comprising a first and second compressible and expansible chamber, a passageway connecting said chambers, means to effect a reset control action by subjecting said first chamber to a first variable compressive force and subjecting said second chamber to a second variable compressive force to cause a liquid in said chambers and passageway to pass through said passageway into or out of said second chamber as the first compressive force is increased and decreased, a pilot valve, bleed nozzle and flapper valve to regulate a control pressure in said pilot valve, means connected between said pilot valve and said first chamber to modify the pressure in that chamber as required to provide a non-linear response to a change in the pressure in said pilot valve, said improvement comprising the addition of magnetizable particles to said liquid and the addition of an electrical circuit to apply a magnetic field of a regulatable magnitude to said particles passing through said passageway to regulate the viscosity of the liquid flowing therethrough and to change the rate at which said reset control action takes place.

17. An improvement in a control instrument comprising a first and second compressible and expansible chamber, a passageway connecting said chambers, means to effect a reset control action by subjecting said first chamber to a first variable compressive force and subjecting said second chamber to a second variable compressive force to cause a liquid in said chambers and passageway to pass through said passageway into or out of said second chamber as the first compressive force is increased and decreased, a pilot valve, bleed nozzle and flapper valve to regulate a control pressure in said pilot valve, means connected between said pilot valve and said first chamber to modify the pressure in that chamber as required to provide a non-linear response to a change in the pressure in said pilot valve, including means for providing a rate time response, said improvement comprising the addition of magnetizable particles to said liquid and the addition of an electrical circuit to apply a magnetic field of a regulatable magnitude to said particles passing through said passageway to regulate the viscosity of the liquid flowing therethrough and to change the rate at which said reset control action takes place.

18. An improvement in a control instrument comprising a first and second compressible and expansible chamber, a passageway connecting said chambers, means to effect a reset control action by subjecting said first chamber to a first variable compressive force and subjecting said second chamber to a second variable compressive force to cause a liquid in said chambers and passageway to pass through said passageway into or out of said second chamber as the first compressive force is increased and decreased, said improvement comprising the addition of magnetizable particles to said liquid and the addition of an electrical circuit to apply a magnetic field of a regulatable magnitude to said particles passing through said passageway to regulate the viscosity of the liquid flowing therethrough and to change the rate at which said reset control action takes place and said electrical circuit comprising a means located at a distance from said instrument to regulate the extent to which said particles are magnetized.

19. An improvement in a control instrument comprising a first and second compressible and expansible chamber, a passageway connecting said chambers, means to effect a reset control action by subjecting said first chamber to a first variable compressive force and subjecting said second chamber to a second variable compressive force to cause a liquid in said chambers and passageway to pass through said passageway into or out of said second chamber as the first compressive force is increased and decreased, said improvement comprising the addition of magnetizable particles to said liquid and the addition of an electrical circuit to apply a magnetic field of a regulatable magnitude to said particles passing through said passageway to regulate the viscosity of the liquid flowing therethrough to thereby change the rate at which said reset control action takes place, said electrical circuit comprising a means located at a distance from said instrument to regulate the extent to which said particles are magnetized and a regulating means to adjust the degree of sensitivity to the nose component of said electrical circuit.

20. An improvement in a control instrument comprising a first and second compressible and expansible chamber, a passageway connecting said chambers, means to effect a reset control action by subjecting said first chamber to a first variable compressive force and subjecting said second chamber to a second variable compressive force to cause a liquid in said chambers and passageway to pass through said passageway into or out of said second chamber as the first compressive force is increased and decreased, said improvement comprising the addition of magnetizable particles to said liquid and the addition of an electrical circuit to apply a magnetic field of a regulatable magnitude to said particles passing through said passageway to regulate the viscosity of the liquid flowing therethrough and to change the rate at which said reset control action takes place and a conductor coiled about said passageway and connected in a circuit including a source of direct current in series with a pair of potentiometers and means responsive to a change in the relative liquid pressures in the first and second chambers for increasing the potential drop in one of said potentiometers and decreasing the potential drop in the other of said potentiometers on a change in a variable pressure to be controlled acting on said control instrument.

21. An improvement in a control instrument comprising a first and second compressible and expansible chamber, a passageway connecting said chambers, means to effect a reset control action by subjecting said first chamber to a first variable compressive force and subjecting said second chamber to a second variable compressive force to cause a liquid in said chambers and passageway to pass through said passageway into or out of said second chamber as the first compressive force is increased and decreased, said improvement comprising the addition of magnetizable particles to said liquid and the addition of an electrical circuit to apply a magnetic field of a regulatable magnitude to said particles passing through said passageway to regulate the viscosity of the liquid flowing therethrough and to change the rate at which said reset control action takes place and a conductor coiled about said passageway and a source of direct current connected across the terminals of said coil and a variable resistor connected between said source and one terminal and a condenser and a second variable resistor in shunt to said condenser connected between the second of said terminals and said current source.

22. An improvement in a control instrument comprising a first and second compressible and expansible chamber, a passageway connecting said chambers, means to effect a reset control action by subjecting said first chamber to a first variable compressive force and subjecting said second chamber to a second variable compressive force to cause a liquid in said chambers and passageway to pass through said passageway into or out of said second chamber as the first compressive force is increased and decreased, said improvement comprising the addition of magnetizable particles to said liquid and the addition of an electrical circuit to apply a magnetic field of a regulatable magnitude to said particles passing through said passageway to regulate the viscosity of the liquid flowing therethrough and to change the rate at which said reset control action takes place and said electrical circuit comprising a control circuit having a conductor coiled about said passageway, terminals connected to a source of current, a means to vary the impedance in said circuit and a means located at a distance from said control instrument to vary the magnitude of the current flowing through said coil and the viscosity of the liquid in said passageway.

23. An improvement in a control instrument comprising a first and second compressible and expansible chamber, a passageway connecting said chambers, means to effect a reset control action by subjecting said first chamber to a first variable compressive force and subjecting said second chamber to a second variable compressive force to cause a liquid in said chambers and passageway to pass through said passageway into or out of said second chamber as the first compressive force is increased and decreased, said improvement comprising the addition of magnetizable particles to said liquid and the addition of an electrical circuit responsive to ambient temperature changes to which the liquid is subjected and operative to apply a magnetic field of a regulatable magnitude to said particles passing through said passageway to regulate the viscosity of the liquid flowing therethrough and to change the rate at which said reset control action takes place.

24. An improvement in a control instrument comprising a first and second chamber each having a flexible wall, a conduit connecting said chambers, said internal wall of said chambers acting as a means for holding a liquid therein, means to effect a reset control action by subjecting said liquid in said first chamber to a variable compressive force and subjecting the liquid in said second chamber to a second variable compressive force whereby liquid is caused to pass through said conduit into or out of said second chamber as the first compressive force is increased and decreased, said improvement comprising the addition of magnetizable particles to said liquid, the addition of an electrical circuit to apply a magnetic field of a regulatable magnitude to said particles in said passageway to regulate the viscosity of the liquid flowing through said conduit and to change the rate at which said reset control action takes place, a conductor in said circuit coiled about said conduit having elongated extensions including a source of current and an adjustable impedance, located at a distance from said control instrument.

25. An improvement in a control instrument that is comprised of a first and second chamber each having at least one compressible and expansible bellows and a passageway between said bellows, said improvement comprising the addition of a magnetizable fluid fill within each of said bellows and said passageway, a means to effect a reset control action by subjecting one of said bellows to a variable pressure signal to produce a delayed corresponding pressure signal on the other of said bellows and a means to variably magnetize said fluid to regulate its viscosity as it passes through said passageway.

26. An improvement in a control instrument that is comprised of at least one chamber having at least one compressible and expansible bellows and a passageway opening into the interior of said bellows, said improvement comprising the addition of a magnetizable fluid fill within said bellows and said passageway and a means to effect a reset control action by employing an electrical circuit to regulate the strength of a magnetic field that is applied by way of a coil surrounding said fluid fill in said passageway to retard or increase the rate of fluid passing therethrough to said bellows as said fluid fill is subjected to a variable fluid pressure signal.

27. An improvement in a differential pressure measuring apparatus that comprises two compressible and expansible chambers, means to effect a reset control action by applying a first pressure signal of one varying magnitude externally on a first chamber and a second pressure signal of a different varying magnitude externally on a second chamber a conduit between and opening into each of said chambers, a liquid within said conduit and said chambers, a connecting rod fixedly attached at one of its ends to one of said chambers and at its other end to the other of said chambers, said improvement comprising the addition of magnetic particles to said liquid and an electrical circuit means for variably magnetizing said fluid in said conduit to control the rate of flow of fluid between said chambers as said reset control action takes place and said fluid is forced by the difference in said pressure signals from one chamber to the other.

References Cited in the file of this patent

UNITED STATES PATENTS

| 2,125,081 | Moore | July 26, 1938 |
| 2,505,049 | Keller | Apr. 25, 1950 |
| 2,661,596 | Winslow | Dec. 8, 1953 |
| 2,667,237 | Rabinow | Jan. 26, 1954 |

OTHER REFERENCES

"Magnetized Iron-Oil Mixes," article in "Business Week," Dec. 18, 1948, pp. 48–50.

"New Uses for Magnetic Fluids," National Bureau of Standards Bulletin; June 1949, pp 74–76.